US011130315B2

United States Patent
Okada et al.

(10) Patent No.: US 11,130,315 B2
(45) Date of Patent: Sep. 28, 2021

(54) HEAT RAY SHIELDING FINE PARTICLES, HEAT RAY SHIELDING FINE PARTICLE DISPERSION LIQUID, HEAT RAY SHIELDING FILM, HEAT RAY SHIELDING GLASS, HEAT RAY SHIELDING DISPERSION BODY, AND HEAT RAY SHIELDING LAMINATED TRANSPARENT SUBSTRATE

(71) Applicant: SUMITOMO METAL MINING CO., LTD., Tokyo (JP)

(72) Inventors: Mika Okada, Isa (JP); Kenji Adachi, Ichikawa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 236 days.

(21) Appl. No.: 15/781,461

(22) PCT Filed: Dec. 2, 2016

(86) PCT No.: PCT/JP2016/085973
§ 371 (c)(1),
(2) Date: Jun. 4, 2018

(87) PCT Pub. No.: WO2017/094909
PCT Pub. Date: Jun. 8, 2017

(65) Prior Publication Data
US 2019/0225503 A1 Jul. 25, 2019

(30) Foreign Application Priority Data

Dec. 2, 2015 (JP) .............................. JP2015-235975
Dec. 2, 2015 (JP) .............................. JP2015-235976
Dec. 2, 2015 (JP) .............................. JP2015-235977
Dec. 2, 2016 (JP) .............................. JP2016-235149
Dec. 2, 2016 (JP) .............................. JP2016-235150
Dec. 2, 2016 (JP) .............................. JP2016-235151

(51) Int. Cl.
*C09D 5/32* (2006.01)
*C09D 167/00* (2006.01)
*C03C 4/08* (2006.01)
*C03C 4/10* (2006.01)
*C03C 17/00* (2006.01)
*B32B 17/10* (2006.01)
*C08K 3/22* (2006.01)

(52) U.S. Cl.
CPC .. *B32B 17/10614* (2013.01); *B32B 17/10036* (2013.01); *C08K 3/22* (2013.01); *C01P 2002/76* (2013.01); *C01P 2002/77* (2013.01); *C01P 2004/61* (2013.01); *C01P 2004/62* (2013.01); *C01P 2004/64* (2013.01); *C08K 2003/2258* (2013.01); *Y10T 428/25* (2015.01); *Y10T 428/268* (2015.01)

(58) Field of Classification Search
CPC ......... C03C 4/082; C03C 4/10; C03C 17/007; C03C 17/009; C03C 2217/445; C03C 2217/475; C03C 2217/48; C03C 2218/11; C03C 2218/32; C03C 17/32; C09D 201/00; C09D 7/40; C09D 7/61; C09D 1/00; C09D 167/00; C09D 5/32; C09D 7/20; C01G 41/006; C01G 41/00; C01G 41/02; C08J 7/04; C09K 3/00; C01P 2004/61; C01P 2002/76; C01P 2004/64; C01P 2002/77; C01P 2004/62; C01P 2006/62; C01P 2006/63; C01P 2006/64
See application file for complete search history.

(56) References Cited

U.S. PATENT DOCUMENTS

| 6,060,154 | A | 5/2000 | Adachi et al. |
| 6,329,061 | B2 | 12/2001 | Kondo |
| 10,442,948 | B2 * | 10/2019 | Okada .................. C09D 17/007 |
| 2010/0261037 | A1 * | 10/2010 | Fujita ..................... C08L 33/08 |
| | | | 428/702 |
| 2013/0323515 | A1 * | 12/2013 | Okabayashi ...... B32B 17/10036 |
| | | | 428/432 |

FOREIGN PATENT DOCUMENTS

| EP | 2 786 972 A1 | 10/2014 |
| EP | 3 473 679 A1 | 4/2019 |
| EP | 3 492 544 A1 | 6/2019 |
| JP | H02-136230 A | 5/1990 |
| JP | H08-259279 A | 10/1996 |
| JP | H11-181336 A | 7/1999 |
| JP | 2005-226008 A | 8/2005 |
| JP | 2007-161539 A | 6/2007 |
| JP | 2008-231164 A | 10/2008 |

(Continued)

OTHER PUBLICATIONS

Naganami et al., JP2011063741, Mar. 31, 2011 (Year: 2011).*

(Continued)

*Primary Examiner* — Cheng Yuan Huang
(74) *Attorney, Agent, or Firm* — Oliff PLC

(57) ABSTRACT

Heat ray shielding fine particles, heat ray shielding fine particle dispersion liquid, heat ray shielding film, heat ray shielding glass, heat ray shielding dispersion body, and heat ray shielding laminated transparent substrate that exhibit heat ray shielding properties and suppress scorching sensation on skin when employed in window materials and the like, also enable usage of communication devices, imaging devices, sensors, etc. that employ near-infrared light across these structures. The particles are composite tungsten oxide fine particles having a heat ray shielding function; and when a visible light transmittance is 85% when computed for light absorption by the particles alone, the average value of transmittance in the wavelength region from 800 nm to 900 nm is 30%-60%, and the average value of transmittance in the wavelength region from 1200 nm to 1500 nm is 20% or lower, and the transmittance at a wavelength of 2100 nm is 22% or lower.

11 Claims, 3 Drawing Sheets

(56) References Cited

FOREIGN PATENT DOCUMENTS

| JP | 2011063741 A | * | 3/2011 | |
|---|---|---|---|---|
| JP | 2011-157504 A | | 8/2011 | |
| JP | 2017-222091 A | | 12/2017 | |
| WO | 2005/037932 A1 | | 4/2005 | |
| WO | 2012/140896 A1 | | 10/2012 | |
| WO | WO-2016121844 A1 | * | 8/2016 | ........... C09D 17/007 |

OTHER PUBLICATIONS

Jan. 31, 2017 International Search Report issued in International Patent Application No. PCT/JP2016/085973.
Ozeki et al. "Effects of Spectral Properties of Solar Radiation through Glasses on Thermal Comfort in a Passenger Compartment." Proceedings of Society of Automotive Engineers of Japan No. 33-99, 1999, pp. 13-16.
Jan. 31, 2017 Written Opinion issued in International Patent Application No. PCT/JP2016/085973.
Jun. 21, 2019 Extended Search Report issued in European Patent Application No. 16870844.4.

* cited by examiner

HEAT RAY SHIELDING FINE PARTICLES, HEAT RAY SHIELDING FINE PARTICLE DISPERSION LIQUID, HEAT RAY SHIELDING FILM, HEAT RAY SHIELDING GLASS, HEAT RAY SHIELDING DISPERSION BODY, AND HEAT RAY SHIELDING LAMINATED TRANSPARENT SUBSTRATE

TECHNICAL FIELD

The present invention relates to heat ray shielding fine particles, a heat ray shielding fine particle dispersion liquid, a heat ray shielding film, a heat ray shielding glass, a heat ray shielding dispersion body, and a heat ray shielding laminated transparent substrate of the same, having good visible light transparency, and transmitting near-infrared light of a predetermined wavelength while exhibiting an excellent heat ray shielding function.

DESCRIPTION OF RELATED ART

Hitherto various techniques have been proposed as heat ray shielding techniques to lower the solar transmittance, while maintaining transparency with a good visible light transmittance. From among these, heat ray shielding techniques using conductive fine particles, a dispersion body of conductive fine particles, and a laminated transparent substrate, have merits such as excellent heat ray shielding properties and low cost compared to other techniques, transparency to radio waves, and moreover high weather resistance.

For example, patent document 1 discloses a transparent resin containing tin oxide fine powder in a dispersed state, and an infrared absorptive synthetic resin molded product obtained by molding a transparent synthetic resin containing tin oxide fine powder in a dispersed state into a sheet or a film, which is then laminated onto a transparent synthetic resin substrate.

Patent document 2 proposes a laminated glass in which an intermediate layer is sandwiched between at least two opposing glass sheets, the intermediate layer having dispersed therein a metal such as Sn, Ti, Si, Zn, Zr, Fe, Al, Cr, Co, Ce, In, Ni, Ag, Cu, Pt, Mn, Ta, W, V, of Mo, a metal oxide thereof, a metal nitride thereof, a metal sulfide thereof, one of these metals doped with a dopant of Sb or F, or a mixture thereof.

Further, the applicant has disclosed in patent document 3 a selectively transmissive layer coating solution having dispersed therein at least one kind of fine particle from out of titanium nitride fine particles and lanthanum boride fine particles, and a selectively transmissive layer thereof.

However, heat ray shielding structures disclosed in patent documents 1 to 3, such as the infrared absorptive synthetic resin molded product, all involve a problem of insufficient heat ray shielding performance when a high visible light transmittance is required. For example, as examples of specific numerical values of heat ray shielding performance possessed by the heat ray shielding structures disclosed in patent documents 1 to 3, when the visible light transmittance computed in accordance with JIS R 3106 (sometimes referred to simply as "visible light transmittance" in the present invention) was 70%, the solar transmittance similarly computed in accordance with JIS R 3106 (sometimes referred to simply as "solar transmittance" in the present invention) exceeded 50%.

The applicant has disclosed in patent document 4 a heat ray shielding dispersion body that is an infrared shielding material fine particle dispersion body produced by dispersing infrared shielding material fine particles in a medium. The infrared shielding material fine particles contain composite tungsten oxide fine particles represented by the formula $M_xW_yO_z$, wherein: element M is at least element selected from out of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \le x/y \le 1$; and $2.2 \le z/y \le 3.0$. The composite tungsten oxide fine particles include at least one kind of fine particles from out of fine particles having a hexagonal, tetragonal, or cubic crystal structure, and a particle size of the infrared shielding material fine particles is from 1 nm to 800 nm.

As disclosed in patent document 4, the heat ray shielding dispersion body employing the composite tungsten oxide fine particles represented by the formula $M_xW_yO_z$ exhibits high heat ray shielding performance, and is improved such that when the visible light transmittance is 70%, the solar transmittance is less than 50%. A heat ray shielding fine particle dispersion body employing composite tungsten oxide fine particles that employ at least element selected from specific elements of Cs, Rb, Tl, and the like as the element M and that have a hexagonal crystal structure exhibit outstanding heat ray shielding performance, and are improved such that when the visible light transmittance is 70%, the solar transmittance is less than 37%.

Moreover, the applicant has disclosed in patent document 5 an ultraviolet/near-infrared light shielding dispersion body containing composite tungsten oxide fine particles that are represented by the formula $M_aWO_c$ (wherein: $0.001 \le a \le 1.0$; $2.2 \le c \le 3.0$; and element M is one or more elements selected from Cs, Rb, K, Tl, In, Ba, Li, Ca, Sr, Fe, and Sn) and that have a hexagonal crystal structure. The powder color of the composite tungsten oxide represented by the formula $M_aWO_c$ as evaluated in L*a*b* color space is L* from 25 to 80, a* from −10 to 10, and b* from −15 to 15.

In patent document 5, an ultraviolet/near-infrared light shielding dispersion body and an ultraviolet/near-infrared light shielding body are obtained that use a fixed ratio combination of composite tungsten oxide fine particles represented by the formula $M_aWO_c$ and iron oxide fine particles. They accordingly both have near-infrared shielding performance and at the same time ultraviolet shielding performance while keeping a specified visible light transparency, and also have a low saturation bronze color tone with excellent design characteristics.

RELATED ART DOCUMENTS

Patent Documents

[Patent document 1] Japanese Unexamined Patent Publication No. 1990-136230
[Patent document 2] Japanese Unexamined Patent Publication No. 1996-259279
[Patent document 3] Japanese Unexamined Patent Publication No. 1999-181336
[Patent document 4] International Publication (WO) No. 2005/037932
[Patent document 5] Japanese Unexamined Patent Publication No. 2008-231164

SUMMARY OF THE INVENTION

Problem to be Solved by the Invention

However, a new problem has been found as a result of an expanded range of markets using the composite tungsten oxide fine particles represented by the formula $M_xW_yO_z$ and the heat ray shielding dispersion body, heat ray shielding film, heat ray shielding glass, heat ray shielding fine particle dispersion body and laminated transparent substrate employing the same.

This problem is that when composite tungsten oxide fine particles represented by the formula $M_xW_yO_z$, and heat ray shielding film and heat ray shielding glass containing such composite tungsten oxide fine particles, and dispersion body and heat ray shielding laminated transparent substrate containing such composite tungsten oxide fine particles, are applied to structures such as window materials and the like, for light passing through such window materials and the like there is a large decrease in the transmittance of near-infrared light in the wavelength region from 700 nm to 1200 nm.

The near infrared light in the above wavelength region is almost invisible to the human eye and oscillation is possible with a light source such as an inexpensive near infrared LED or the like, and therefore near-infrared light is widely utilized for communication, imaging devices, sensors, and the like. However, structures such as window materials and the like, heat ray shielding body and heat ray shielding substrate, and structures such as dispersion body and laminated transparent substrate and the like that employ the composite tungsten oxide fine particles represented by the formula $M_xW_yO_z$ also strongly absorb near-infrared light in such a wavelength region, together with absorbing heat rays.

This sometimes results in limitations being placed to usage of communication, imaging devices, sensors, and the like that use near-infrared light across structures such as window materials and the like, heat ray shielding film and heat ray shielding glass, and dispersion body and laminated transparent substrate that employ the composite tungsten oxide fine particles represented by the formula $M_xW_yO_z$.

For example, when a heat ray shielding film employing the composite tungsten oxide fine particles disclosed in patent document 4 is stuck onto the windows of ordinary housing, this interferes with communication by near-infrared light between infrared transmitters placed indoors and intrusion detectors configured from infrared receivers placed outdoors, such that the devices did not operate normally.

Despite the presence of such problems, heat ray shielding film and structures such as window materials and the like, dispersion body and heat ray shielding laminated transparent substrate that employ composite tungsten oxide fine particles and the like exhibit a high degree of heat ray cutting performance, and the usage of heat ray shielding has expanded in favorable markets. However, using such heat ray shielding film and structures such as window materials, dispersion body and heat ray shielding laminated transparent substrate means that wireless communication, imaging devices, sensors, and the like that use near-infrared light are not able to be employed.

In addition, composite tungsten oxide fine particles represented by the formula $M_xW_yO_z$, and heat ray shielding dispersion body, heat ray shielding film, heat ray shielding glass, heat ray shielding fine particle dispersion body and laminated transparent substrate employing such composite tungsten oxide fine particles, have not provided adequate shielding of heat rays at a wavelength of 2100 nm.

For example, when a heat ray shielding film employing the composite tungsten oxide fine particles disclosed in patent document 4 is stuck onto the windows of ordinary housing, a scorching heat was still felt on the skin indoors.

In view of the above circumstances, the present invention is configured as follows. In order to solve this problem, heat ray shielding fine particles, a heat ray shielding fine particle dispersion liquid, a heat ray shielding film, a heat ray shielding glass, a heat ray shielding dispersion body, and a heat ray shielding laminated transparent substrate are provided that as well as exhibiting heat ray shielding properties and suppressing a scorching sensation on the skin when employed in structures such as window materials and the like, also enable usage of communication devices, imaging devices, sensors and the like that employ near-infrared light across these structures, the heat ray shielding film or heat ray shielding glass, the dispersion body and the laminated transparent substrate.

Means for Solving the Problem

The inventors of the present invention have performed various investigations to solve the above problem.

For example, it was thought that to enable the usage of communication devices, imaging devices, sensors and the like employing near-infrared light even across a heat ray shielding film, a heat ray shielding glass, a heat ray shielding dispersion body, and a heat ray shielding laminated transparent substrate it would be sufficient to raise the transmittance for near-infrared light in the wavelength region from 800 nm to 900 nm. Then, in order to simply raise the transmittance of near-infrared light in such a wavelength region, is was thought that it would be sufficient to appropriately reduce the in-layer concentration of the composite tungsten oxide fine particles, the concentration of composite tungsten oxide fine particles in the heat ray shielding film and the heat ray shielding glass, and the in-layer concentration of the composite tungsten oxide fine particles in the heat ray shielding dispersion body and the heat ray shielding laminated transparent substrate.

However, when the concentration of the composite tungsten oxide fine particles and the in-layer concentration of composite tungsten oxide fine particles in the heat ray shielding dispersion body and the heat ray shielding laminated transparent substrate were reduced, there was also at the same time a reduction of a heat ray absorption ability, with transmittance being at a bottom in a wavelength region from 1200 nm to 1800 nm, causing a reduction in the heat ray shielding effect, and resulting in a scorching sensation also being felt on the skin.

It is thought that in sunlight it is the heat rays with wavelengths from 1500 nm to 2100 nm that greatly influence the scorching sensation to skin (see, for example, Proceedings of Society of Automotive Engineers of Japan No. 33-99, 13 (1999) by OZEKI Yoshiichi et. al.). This is thought to be because although human skin only has a small absorbance for near-infrared light in the wavelength region from 700 nm to 1200 nm, human skin has a large absorbance for wavelengths from 1500 nm to 2100 nm.

Based on the above knowledge, as a result of their various investigations, the inventors of the present invention have found that in a heat treatment (firing) step of producing composite tungsten oxide fine particles expressed by the formula $M_xWO_y$, the composite tungsten oxide fine particles can be obtained capable of controlling the absorption in the wavelength region from 800 to 900 nm, and improving the absorption ability in the wavelength of 2100 nm while maintaining the heat ray absorption ability, with transmittance being at the bottom in the wavelength region from 1200 nm to 1800 nm, by controlling a reduction state within a predetermined range.

However, there was a concern that the composite tungsten oxide fine particles that have improved in transmittance of near-infrared light in the wavelength region from 800 nm to 900 nm might be inferior in comparison to composite tungsten oxide of the conventional technique when evaluated using a known index (for example, the solar transmittance with respect to visible light transmittance evaluated under JIS R 3106) used for an evaluation reference of heat ray shielding performance of a dispersion body of heat ray shielding fine particles.

Therefore, from this viewpoint, further investigations were accordingly performed regarding the composite tungsten oxide fine particles produced by controlling the reduction state during heat treatment.

It was found that the composite tungsten oxide fine particles that have improved in transmittance of near-infrared light in the wavelength region from 800 nm to 900 nm, due to controlling the reduction state during the heat treatment, were not inferior in performance as heat ray shielding fine particles in comparison to composite tungsten oxide fine particles of the conventional technique.

This is because there was also a high transmittance of visible light for the composite tungsten oxide fine particles that have improved in transmittance of near-infrared light in the wavelength region from 800 nm to 900 nm. This consequently enables a higher concentration to be set for the concentration of the composite tungsten oxide fine particles per unit surface area, while ensuring the transmittance of visible light. This is because the transmission of heat rays in the wavelength region from 1500 nm to 2100 nm can be suppressed as a result of setting this higher concentration.

As a result of the above investigations, the inventors of the present invention have achieved heat ray shielding fine particles that are composite tungsten oxide fine particles having a heat ray shielding function, wherein when a visible light transmittance is 85% when computed for light absorption by the composite tungsten oxide fine particles alone, the average value of transmittance in the wavelength region from 800 nm to 900 nm is from 30% to 60%, and the average value of transmittance in the wavelength region from 1200 nm to 1500 nm is 20% or lower, and the transmittance at a wavelength of 2100 nm is 22% or lower, thereby completing the present invention.

Moreover, the inventors of the present invention have found that heat ray shielding materials, heat ray shielding film and heat ray shielding glass, heat ray shielding dispersion body and laminated transparent substrate employing the composite tungsten oxide fine particles according to the present invention are also not inferior in performance as a heat ray shielding body, and are also equivalent to composite tungsten oxide fine particles of the conventional technique from the perspective of suppressing a scorching sensation to skin.

Namely, in order to solve the above problems, a first invention is heat ray shielding fine particles wherein:

the heat ray shielding fine particles are composite tungsten oxide fine particles having a heat ray shielding function; and when a visible light transmittance is 85% when computed for light absorption by the composite tungsten oxide fine particles alone, the average value of transmittance in the wavelength region from 800 nm to 900 nm is from 30% to 60%, and the average value of transmittance in the wavelength region from 1200 nm to 1500 nm is 20% or lower, and the transmittance at a wavelength of 2100 nm is 22% or lower.

A second invention is the heat ray shielding fine particles, wherein a powder color of the composite tungsten oxide fine particles in L*a*b* color space is L* from 30 to 55, a* from −6.0 to −0.5, and b* from −10 to 0.

A third invention is the heat ray shielding fine particles, wherein the composite tungsten oxide fine particles are represented by general formula $M_xWO_y$, in which:

M is one or more elements selected from Cs, Rb, K, Tl, and Ba;

$0.1 \leq x \leq 0.5$; and $2.2 \leq y \leq 3.0$.

A fourth invention is the heat ray shielding fine particles, wherein the composite tungsten oxide fine particles have a hexagonal system crystal structure, with a lattice constant on the c-axis being from 7.56 Å to 8.82 Å.

A fifth invention is the heat ray shielding fine particles, wherein a particle size of the heat ray shielding fine particles is from 1 nm to 800 nm.

A sixth invention is a heat ray shielding fine particle dispersion liquid wherein:

the heat ray shielding fine particle dispersion liquid is a dispersion liquid containing the heat ray shielding fine particles dispersed in a liquid medium; and the liquid medium is selected from water, an organic solvent, an oil/fat, a liquid resin, a liquid plasticizer for plastic (called a liquid plasticizer hereafter), and any mixture thereof.

A seventh invention is the heat ray shielding fine particle dispersion liquid, wherein a content of the heat ray shielding fine particles contained in the liquid medium is from 0.01 mass % to 80 mass %.

An eighth invention is a method for producing heat ray shielding fine particles, including:

mixing tungstic acid with a hydroxide powder of one or more elements selected from Cs, Rb, K, Tl, and Ba at a predetermined ratio to obtain a mixed powder; and performing reduction treatment by heating the mixed powder under a supply of $H_2$ gas at 0.8% or less in an inert gas as a carrier to obtain a composite tungsten oxide powder containing one or more elements selected from Cs, Rb, K, Tl, and Ba.

A ninth invention is a method for producing a heat ray shielding fine particle dispersion liquid, including a dispersion step of dispersing the heat ray shielding fine particles obtained by invention eight in a liquid medium to obtain a heat ray shielding fine particle dispersion liquid.

A tenth invention is a heat ray shielding fine particle dispersion liquid, further containing one or more kinds selected from an ultraviolet absorber, a HALS, and an antioxidant.

An eleventh invention is a heat ray shielding film or a heat ray shielding glass containing heat ray shielding fine particles, wherein:

the heat ray shielding fine particles are composite tungsten oxide fine particles having a heat ray shielding function; and when a visible light transmittance is 85% when computed for light absorption by the composite tungsten oxide fine particles alone, the average value of transmittance in the wavelength region from 800 nm to 900 nm is from 30% to 60%, and the average value of transmittance in the wavelength region from 1200 nm to 1500 nm is 20% or lower, and the transmittance at a wavelength of 2100 nm is 22% or lower.

A twelfth invention is the heat ray shielding film or the heat ray shielding glass, wherein the composite tungsten oxide fine particles have a hexagonal system crystal structure, with a lattice constant on the c-axis being from 7.56 Å to 8.82 Å.

A thirteenth invention is the heat ray shielding film or the heat ray shielding glass further including a coating layer on at least one face of a transparent substrate selected from a transparent film substrate or a transparent glass substrate, the coating layer being a binder resin layer containing the heat ray shielding fine particles.

A fourteenth invention is the heat ray shielding film or the heat ray shielding glass, wherein the binder resin is a UV curing resin binder.

A fifteenth invention is the heat ray shielding film or the heat ray shielding glass, wherein a thickness of the coating layer is 10 μm or less.

A sixteenth invention is the heat ray shielding film, wherein the transparent film substrate is a polyester film.

A seventeenth invention is the heat ray shielding film or the heat ray shielding glass, wherein a content of the heat ray shielding fine particles contained in the coating layer per unit projected area is from 0.1 g/m$^2$ to 5.0 g/m$^2$.

An eighteenth invention is the heat ray shielding film or the heat ray shielding glass, wherein when a visible light transmittance is 70%, an average value of transmittance in the wavelength region from 800 nm to 900 nm is from 13% to 40%, and the average value of transmittance in the wavelength region from 1200 nm to 1500 nm is 8% or lower, and the transmittance at a wavelength of 2100 nm is 9% or lower.

A nineteenth invention is a method for producing a heat ray shielding film or a heat ray shielding glass, including:

mixing tungstic acid and a hydroxide powder of one or more elements selected from Cs, Rb, K, Tl, and Ba at a predetermined ratio to obtain a mixed powder;

performing reduction treatment to the mixed powder by heating under a supply of H$_2$ gas at 0.8% or less in an inert gas as a carrier to obtain a composite tungsten oxide powder containing one or more elements selected from Cs, Rb, K, Tl, and Ba;

uniformly mixing the composite tungsten oxide powder into a transparent resin to obtain a heat ray shielding fine particle dispersion body; and coating a transparent film substrate or a transparent glass substrate with the heat ray shielding fine particle dispersion body.

A twentieth invention is the heat ray shielding glass or the heat ray shielding film further containing one or more kinds selected from an ultraviolet absorber, a HALS, and an antioxidant.

A twenty-first invention is heat ray shielding fine particle dispersion body, which is a heat ray shielding fine particle dispersion body of composite tungsten oxide fine particles having a heat ray shielding function, wherein when a visible light transmittance is 85% which is obtained by computing only light absorption by the composite tungsten oxide fine particles, the average value of transmittance in the wavelength region from 800 nm to 900 nm is from 30% to 60%, and the average value of transmittance in the wavelength region from 1200 nm to 1500 nm is 20% or lower, and the transmittance at a wavelength of 2100 nm is 22% or lower.

A twenty-second invention is the heat ray shielding fine particle dispersion body, wherein the composite tungsten oxide fine particles have a hexagonal system crystal structure, with a lattice constant on the c-axis being from 7.56 Å to 8.82 Å.

A twenty-third invention is the heat ray shielding fine particle dispersion body, wherein the composite tungsten oxide fine particles are dispersed in a thermoplastic resin, and the thermoplastic resin is:

any one resin selected from a resin group consisting of a polyethylene terephthalate resin, a polycarbonate resin, an acrylic resin, a styrene resin, a polyamide resin, a polyethylene resin, a vinyl chloride resin, an olefin resin, an epoxy resin, a polyimide resin, a fluororesin, an ethylene/vinyl acetate copolymer, and a polyvinyl acetal resin; or a mixture of two or more resins selected from the resin group; or a copolymer of two or more resins selected from the resin group.

A twenty-fourth invention is the heat ray shielding fine particle dispersion body, wherein the composite tungsten oxide particles are contained at from 0.5 mass % to 80.0 mass %.

A twenty-fifth invention is the heat ray shielding fine particle dispersion body, wherein the heat ray shielding fine particle dispersion body is in a sheet shape, a board shape, or a film shape.

A twenty-sixth invention is the heat ray shielding fine particle dispersion body, wherein a content of the heat ray shielding fine particles contained in the heat ray shielding fine particle dispersion body per unit projected area is from 0.1 g/m$^2$ to 5.0 g/m$^2$.

A twenty-seventh invention is the heat ray shielding fine particle dispersion body, wherein when a visible light transmittance is 70%, an average value of transmittance in the wavelength region from 800 nm to 900 nm is from 13% to 40%, and the average value of transmittance in the wavelength region from 1200 nm to 1500 nm is 8% or lower, and the transmittance at a wavelength of 2100 nm is 5% or lower.

A twenty-eighth invention is a heat ray shielding laminated transparent substrate including the heat ray shielding fine particle dispersion body of any one of the twenty-first to twenty-seventh inventions interposed between plural sheets of transparent substrate.

A twenty-ninth invention is the heat ray shielding laminated transparent substrate, wherein when a visible light transmittance is 70%, an average value of transmittance in the wavelength region from 800 nm to 900 nm is from 12% to 40%, and the average value of transmittance in the wavelength region from 1200 nm to 1500 nm is 8% or lower, and the transmittance at a wavelength of 2100 nm is 8.0% or lower.

A thirtieth invention is a method for producing a heat ray shielding fine particle dispersion body, including:

mixing tungstic acid and a hydroxide powder of one or more elements selected from Cs, Rb, K, Tl, and Ba at a predetermined ratio to obtain a mixed powder;

performing reduction treatment to the mixed powder by heating under a supply of H$_2$ gas at 0.8% or less in an inert gas as a carrier to obtain a composite tungsten oxide powder containing one or more elements selected from Cs, Rb, K, Tl, and Ba; and uniformly mixing the composite tungsten oxide powder into a transparent resin to obtain a heat ray shielding fine particle dispersion body.

A thirty-first invention is a method for producing a heat ray shielding laminated transparent substrate, including a step of sandwiching the heat ray shielding fine particle dispersion body of the thirtieth invention with a transparent substrate.

A thirty-second invention is a method for producing a heat ray shielding laminated transparent substrate, including a step of molding the heat ray shielding fine particle dispersion body of the thirtieth invention into a film shape or a board shape.

A thirty-third invention is the heat ray shielding fine particle dispersion body or the heat ray shielding laminated transparent substrate further containing one or more kinds selected from an ultraviolet absorber, a HALS, and an antioxidant.

A twenty-second invention is the heat ray shielding fine particle dispersion body, wherein the composite tungsten oxide fine particles have a hexagonal system crystal structure, with a lattice constant on the c-axis being from 7.56 Å to 8.82 Å.

A twenty-third invention is the heat ray shielding fine particle dispersion body, wherein the thermoplastic resin is:

any one resin selected from a resin group consisting of a polyethylene terephthalate resin, a polycarbonate resin, an acrylic resin, a styrene resin, a polyamide resin, a polyethylene resin, a vinyl chloride resin, an olefin resin, an epoxy resin, a polyimide resin, a fluororesin, an ethylene/vinyl acetate copolymer, and a polyvinyl acetal resin; or a mixture of two or more resins selected from the resin group; or a copolymer of two or more resins selected from the resin group.

A twenty-fourth invention is the heat ray shielding fine particle dispersion body, wherein the composite tungsten oxide particles are contained at from 0.5 mass % to 80.0 mass %.

A twenty-fifth invention is the heat ray shielding fine particle dispersion body, wherein the heat ray shielding fine particle dispersion body is in a sheet shape, a board shape, or a film shape.

A twenty-sixth invention is the heat ray shielding fine particle dispersion body, wherein a content of the heat ray shielding fine particles contained in the heat ray shielding fine particle dispersion body per unit projected area is from 0.1 g/m² to 5.0 g/m².

A twenty-seventh invention is the heat ray shielding fine particle dispersion body, wherein when a visible light transmittance is 70%, an average value of transmittance in the wavelength region from 800 nm to 900 nm is from 13% to 40%, and the average value of transmittance in the wavelength region from 1200 nm to 1500 nm is 8% or lower, and the transmittance at a wavelength of 2100 nm is 5% or lower.

A twenty-eighth invention is a heat ray shielding laminated transparent substrate including the heat ray shielding fine particle dispersion body of any one of the twenty-first to twenty-seventh inventions interposed between plural sheets of transparent substrate.

A twenty-ninth invention is the heat ray shielding laminated transparent substrate, wherein when a visible light transmittance is 70%, an average value of transmittance in the wavelength region from 800 nm to 900 nm is from 12% to 40%, and the average value of transmittance in the wavelength region from 1200 nm to 1500 nm is 8% or lower, and the transmittance at a wavelength of 2100 nm is 8.0% or lower.

Advantage of the Invention

The heat ray shielding film, the heat ray shielding glass, the heat ray shielding dispersion body, and the heat ray shielding laminated transparent substrate that are produced by employing the heat ray shielding fine particles and the heat ray shielding fine particle dispersion liquid according to the present invention, as well as exhibiting heat ray shielding properties and suppressing a scorching sensation on the skin, also enable usage of communication devices, imaging devices, sensors and the like that employ near-infrared light even when employed across such structures.

DETAILED DESCRIPTION OF THE INVENTION

Figure 1:
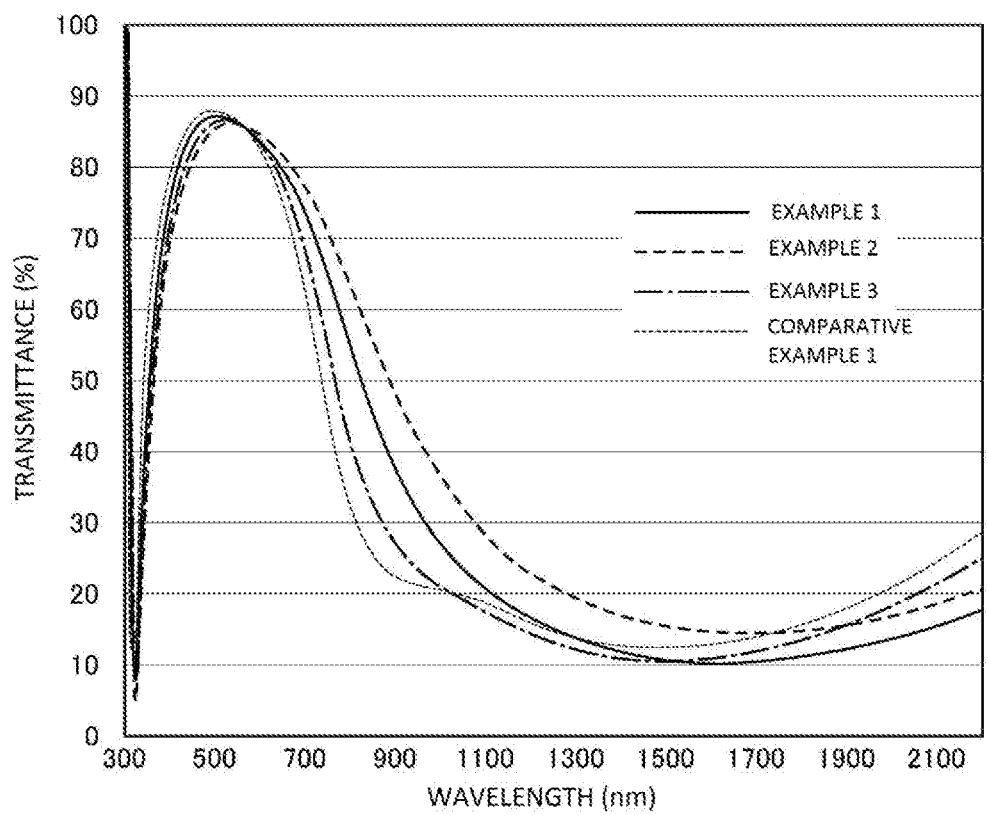
FIG. 1 is transmittance profiles by wavelength of composite tungsten oxide fine particle dispersion liquids according to the present invention.

Explanation follows, in sequence, regarding embodiments for implementing the present invention, under the headings [a] Heat Ray Shielding Fine Particles, [b] Heat Ray Shielding Fine Particle Producing Method, [c] Heat Ray Shielding Fine Particle Dispersion Liquid and Producing Method Thereof, [d] Heat Ray Shielding Film and Heat Ray Shielding Glass Producing Method, [e] Heat Ray Shielding Fine Particle Dispersion Body Producing Method, and [f] Heat Ray Shielding Laminated Transparent Substrate Producing Method.

[a] Heat Ray Shielding Fine Particles (Composite Tungsten Oxide Fine Particles)

The heat ray shielding fine particles according to the present invention are composite tungsten oxide fine particles wherein, when a visible light transmittance is 85% when computed for light absorption by the composite tungsten oxide fine particles alone, the average value of transmittance for wavelengths from 800 nm to 900 nm is from 30% to 60%, and the average value of transmittance in the wavelength region from 1200 nm to 1500 nm is 20% or lower, and the transmittance at a wavelength of 2100 nm is 22% or lower.

When represented by the formula $M_xWO_y$, element M is one or more elements selected from Cs, Rb, K, Tl, and Ba, W is tungsten, and O is oxygen. The composite tungsten oxide fine particles satisfy $0.1 \leq x \leq 0.5$, and $2.2 \leq y \leq 3.0$.

Moreover, the heat ray shielding fine particles are composite tungsten oxide fine particles having a hexagonal system crystal structure, with a lattice constant on the c-axis being from 7.56 Å to 8.82 Å.

The addition amount of the element M is a value of x preferably from 0.18 to 0.5, and more preferably from 0.18 to 0.33. This is because single-phase hexagonal crystals are easily obtained and a heat ray absorption effect is sufficiently exhibited when the value of x is from 0.18 to 0.33. As well as hexagonal crystals, sometimes cuboidal crystals and rhombic crystals represented by $M_{0.36}WO_{3.18}$ ($Cs_4W_{11}O_{35}$) also precipitate out, however, these precipitates do not influence the heat ray absorption effect.

Moreover, the value of y is preferably $2.2 \leq y \leq 3.0$, and more preferably $2.7 \leq y \leq 3.0$.

Moreover, some of the oxygen in the composite tungsten oxide may be substituted with another element. Such other elements include, for example, nitrogen and sulfur, a halogen, or the like.

The particle size of the composite tungsten oxide fine particles according to the present invention can be appropriately selected according to the purpose of use of the composite tungsten oxide fine particles, or of the heat ray shielding layer/heat ray shielding substrate produced by employing a dispersion liquid thereof. However, the particle size is preferably from 1 nm to 800 nm. This is because when the particle size is 800 nm or less, powerful near-infrared absorption can be exhibited by the composite tungsten oxide fine particles according to the present invention, and moreover, industrial manufacture is easy when the particle size is 1 nm or more.

In cases in which a heat ray shielding layer is to be used in an application requiring transparency, preferably the composite tungsten oxide fine particles have a dispersed particle size of 40 nm or less. This is because scattering of light by the fine particles in Mie scattering and Rayleigh scattering is sufficiently suppressed when the composite tungsten oxide fine particles have a dispersed particle size smaller than 40 nm, and transparency can be efficiently maintained at the same time as maintaining visibility in the visible light wavelength region. In order to further suppress scattering when employed in applications having particular requirements for transparency, such as windshields of automobiles, the dispersed particle size of the composite tungsten oxide fine particles should be 30 nm or less, and preferably 25 nm or less.

The composite tungsten oxide fine particles according to the present invention have improved in transmittance of the near-infrared light in the wavelength region from 800 to 900 nm and assure the heat ray absorbing ability at the wavelength of 2100 nm with transmittance being at a bottom in the wavelength region from 1200 to 1800 nm while having the heat ray shielding ability in the wavelength region from 1200 to 1500 nm. The reason therefore is considered to be the electron structure of the composite tungsten oxide fine particles, and the light absorption mechanism derived from the electron structure.

In the composite tungsten oxide fine particles represented by the formula $M_xWO_y$ according to the present invention, element M is one or more elements selected from Cs, Rb, K, Tl, and Ba, W is tungsten, and O is oxygen. They are also composite tungsten oxide fine particles that satisfy $0.1 \leq x \leq 0.5$ and $2.2 \leq y \leq 3.0$, and have a hexagonal crystal structure.

The addition amount of the element M is a value of x preferably from 0.18 to 0.5, and more preferably from 0.18 to 0.33. This is because single-phase hexagonal crystals are easily obtained and a heat ray absorption effect is sufficiently exhibited when the value of x is from 0.18 to 0.33. As well as hexagonal crystals, sometimes cuboidal crystals and rhombic crystals represented by $M_{0.36}WO_{3.18}$ ($Cs_4W_{11}O_{35}$) also precipitate out, however, these precipitates do not influence the heat ray absorption effect.

(Heat Treatment Conditions for Producing the Composite Tungsten Oxide Fine Particles)

The inventors of the present invention produced composite tungsten oxide fine particles similar to those of Example 3, described later, except for employing the four levels of heat treatment conditions described below under <Heat Treatment Conditions 1 to 4>.

<Heat Treatment Condition 1>

After performing thermal reduction treatment for 30 minutes at a temperature of 500° C. under a supply of $H_2$ gas at 0.3% in $N_2$ gas as a carrier, firing was performed for 1 hour at a temperature of 800° C. under an $N_2$ gas atmosphere.

<Heat Treatment Condition 2>

This was similar to the heat treatment according to Example 1, described later.

After performing thermal reduction treatment for 4 hours at a temperature of 500° C. under a supply of $H_2$ gas at 0.3% in $N_2$ gas as a carrier, firing was performed for 1 hour at a temperature of 800° C. under an $N_2$ gas atmosphere.

<Heat Treatment Condition 3>

This was similar to the heat treatment according to Example 3, described later.

After performing thermal reduction treatment for 6 hours at a temperature of 500° C. under a supply of $H_2$ gas at 0.3% in $N_2$ gas as a carrier, firing was performed for 1 hour at a temperature of 800° C. under an $N_2$ gas atmosphere.

<Heat Treatment Condition 4>

This was similar to the heat treatment according to Comparative Example 1, described later.

After performing thermal reduction treatment for 1 hours at a temperature of 550° C. under a supply of $H_2$ gas at 5% in $N_2$ gas as a carrier, firing was performed for 1 hour at a temperature of 800° C. under an $N_2$ gas atmosphere.

Other than employing respective caesium tungsten bronzes produced by performing the four levels of heat treatment conditions described above under <Heat Treatment Conditions 1 to 4>, operation was performed similarly to in Example 1, described later, to obtain the heat ray shielding fine particle dispersion liquids according to Samples 1 to 4.

The average dispersed particle size of the composite tungsten oxide fine particles according to the present invention (caesium tungsten bronze fine particles) in each of the heat ray shielding fine particle dispersion liquid samples was measured and found to be in a range from 20 nm to 30 nm.

<Summary of Heat Treatment Conditions 1 to 4>

By controlling temperature conditions and atmosphere conditions in the heat treatment when producing the composite tungsten oxide fine particles in a control direction to weaken reduction treatment, the inventors of the present invention were able to obtain composite tungsten oxide particles in which, when a visible light transmittance is 85% when computed for light absorption by the composite tungsten oxide particles alone, the average value of transmittance for wavelengths from 800 nm to 900 nm is from 30% to 60%, and the average value of transmittance in the wavelength region from 1200 nm to 1500 nm is 20% or lower, and the transmittance at a wavelength of 2100 nm is 22% or lower.

These composite tungsten oxide fine particles had a hexagonal system crystal structure, with a lattice constant on the c-axis being from 7.56 Å to 8.82 Å.

Moreover, the composite tungsten oxide fine particles had increased transmittance in the visible light region, and so it was possible to slightly raise the concentration of the composite tungsten oxide fine particles in the heat ray shielding layer.

The shape of the transmittance profile of the composite tungsten oxide particles according to the present invention as described above was found to have the following characteristics (1) to (3) in comparison to the transmittance profile of composite tungsten oxide fine particles of the conventional technique.

(1) For the composite tungsten oxide particles according to the present invention, the region of the visible light transmission band is spread out to a region in the wavelength region from 800 nm to 900 nm, which is a near-infrared light region, and there is a high transmittance even in this wavelength region.

(2) For the composite tungsten oxide particles according to the present invention, the value of transmittance in the wavelength region from 1200 nm to 1500 nm is substantially constant.

(3) The composite tungsten oxide particles according to the present invention exhibited heat ray shielding performance even at the wavelength of 2100 nm.

[b] Heat Ray Shielding Fine Particle Producing Method

The composite tungsten oxide fine particles according to the present invention could be obtained by heat treating a tungsten compound starting material in a reducing gas atmosphere.

First, explanation follows regarding the tungsten compound starting material.

The tungsten compound starting material according to the present invention is a mixture containing tungsten and element M in elemental form or as compounds. As the tungsten raw material, preferably one or more raw materials is selected from a tungstic acid powder, a tungsten trioxide powder, a tungsten dioxide powder, a hydrate powder of tungsten oxide, a tungsten hexachloride powder, an ammonium tungstate powder, a hydrate powder of an oxide of tungsten obtained by dissolving tungsten hexachloride powder in alcohol and then drying, a hydrate powder of an oxide of tungsten obtained by dissolving tungsten hexachloride in alcohol and then adding water to cause precipitation then drying the precipitate, a tungsten compound powder obtained by drying an aqueous solution of ammonium tungstate, and a tungsten metal powder. Examples of the raw material for the element M include element M in elemental form, and a chloride salt, a nitrate salt, a sulfate salt, an oxalate salt, an oxide, a carbonate, a tungstic acid salt, and a hydroxide of element M, and the like; however there is no limitation thereto.

The above tungsten compound starting material is weighed, and a predetermined amount satisfying $0.1 \leq x \leq 0.5$ is blended and mixed. When doing so, the respective raw materials for the tungsten and the element M are mixed as uniformly as possible, and if possible are preferably uniformly mixed at the molecular level. Thus, each of the above raw material are most preferably mixed in the form of solutions, and each of the raw materials is preferably soluble in a solvent such as water, an organic solvent, or the like.

When the raw materials are each soluble in a solvent such as water, an organic solvent, or the like, then the tungsten compound starting material according to the present invention can be produced by evaporating off the solvent after sufficiently mixing each of the raw materials and the solvent. Naturally, even without a solvent in which each of the raw materials is soluble, the tungsten compound starting material according to the present invention can be produced by sufficiently uniformly mixing the raw materials together using a known means such as a ball mill.

Next, explanation follows regarding the heat treatment in a reducing gas atmosphere. The starting material is preferably heat treated at from 300° C. to 900° C., more preferably from 500° C. to 800° C., and still more preferably from 500° C. to 600° C. This is preferable because a reaction to generate a composite tungsten oxide having a hexagonal crystal structure according to the present invention progresses when the temperature is 300° C. or above, and the generation of unintentional byproducts, such as composite tungsten oxide fine particles with crystal structures other than hexagonal crystal structures and tungsten metal does not readily occur at 900° C. or below.

The reducing gas used here is not particularly limited, but is preferably $H_2$. When $H_2$ is employed as the reducing gas, the composition of the reducing atmosphere is preferably, for example, one in which $H_2$ is mixed with an inert gas such as Ar, $N_2$ or the like at a volume ratio of 2.0% or less, more preferably mixed at from 0.1% to 0.8%, and still more preferably at from 0.1% to 0.5%. When the volume ratio of the $H_2$ is from 0.1% to 0.8%, reduction can progress with good efficiency while controlling the reduction state to appropriate conditions for the present invention. The conditions of the reduction temperature and reduction time, and the type and concentration of the reducing gas, may be appropriately selected according to the amount of the sample.

If necessary, after performing the reduction treatment in the reducing gas atmosphere, heat treatment may be performed in an inert gas atmosphere. In such cases, the heat treatment in the inert gas atmosphere is preferably performed at a temperature from 400° C. to 1200° C.

As a result, the composite tungsten oxide fine particles having a hexagonal system crystal structure can be obtained. The lattice constant on the c-axis of these composite tungsten oxide fine particles is preferably from 7.56 Å to 8.82 Å, and is more preferably from 7.56 Å to 7.61 Å. Moreover, the powder color of the composite tungsten oxide fine particles in L*a*b* color space is L* from 30 to 55, a* from −6.0 to −0.5, and b* from −10 to 0.

Preferably from the viewpoint of improving weather resistance, the heat ray shielding fine particles according to the present invention are surface treated using a compound containing one or more elements selected from Si, Ti, Zr, and Al, and are preferably coated by an oxide. To perform this surface treatment, a known surface treatment method may be performed using an organic compound containing one or more elements selected from Si, Ti, Zr, and Al. For example, the heat ray shielding fine particles according to the present invention and an organosilicon compound may be mixed together, and hydrolysis treatment performed.

[c] Heat Ray Shielding Fine Particle Dispersion Liquid and Producing Method Thereof The heat ray shielding fine particle dispersion liquid according to the present invention is the heat ray shielding fine particles dispersed in a liquid medium.

The heat ray shielding fine particle dispersion liquid according to the present invention can be obtained by adding the composite tungsten oxide fine particles according to the present invention, and optionally an appropriate amount of a dispersant, a coupling agent, a surfactant, and the like to a liquid medium, and then performing dispersion treatment thereon to disperse the fine particles in the liquid medium so as to obtain the dispersion liquid.

The heat ray shielding fine particle dispersion liquid may be employed similarly to a conventional material that strongly absorbs near-infrared rays, for example, similarly to a dispersion liquid of conventional composite tungsten oxide fine particles in various fields in which composite tungsten oxide is employed as illustrated in patent document 4.

The heat ray shielding fine particle dispersion liquid according to the present invention will be explained as follows, in sequence, under the headings of [1] Medium, [2] Heat Ray Shielding Fine Particles, [3] Dispersant, Coupling Agent, [4] Ultraviolet Absorbent, [5] Light Stabilizer, [6] Antioxidant, and [7] Dispersion Treatment Method. Note that in the present invention the heat ray shielding fine particle dispersion liquid is sometimes simply referred to as "dispersion liquid".

[1] Medium

The medium of the heat ray shielding fine particle dispersion liquid needs to have functionality to maintain the dispersibility of the heat ray shielding fine particles and functionality to not cause coating defects when coating the heat ray shielding fine particle dispersion liquid.

The heat ray shielding fine particle dispersion liquid can be produced by selecting as the medium water, an organic solvent, an oil/fat, a liquid resin, a liquid plasticizer, or a mixture thereof.

As the organic solvent satisfying these requirements, various organic solvents can be selected, such as an alcohol-based, ketone-based, hydrocarbon-based, glycol-based, or water-based organic solvent. Specific example thereof include: alcohol-based solvents such as methanol, ethanol, 1-propanol, isopropanol, butanol, pentanol, benzyl alcohol, diacetone alcohol and the like; ketone-based solvents such as acetone, methyl ethyl ketone, methyl propyl ketone, methyl isobutyl ketone, cyclohexanone, isophorone and the like; ester-based solvents such as 3-methyl-methoxy-propionate and the like; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate and the like; amides such as formamide, N-methylformamide, dimethylformamide, dimethylacetamide, N-methyl-2-pyrrolidone and the like; aromatic hydrocarbons such as toluene, xylene and the like; and halogenated hydrocarbons such as ethylene chloride, chlorobenzene, and the like. An organic solvent having a low polarity is preferable from out of the above, and, in particular, isopropyl alcohol, ethanol, 1-methoxy-2-propanol, dimethyl ketone, methyl ethyl ketone, methyl isobutyl ketone, toluene, propylene glycol monomethyl ether acetate, n-butyl acetate, and the like are more preferable. These solvents may be used alone or in a combination of two or more thereof.

Methyl methacrylate or the like is preferable as the liquid resin. Preferable examples of the liquid plasticizer include a plasticizer that is an ester compound of a monohydric alcohol and an organic acid, an ester-based plasticizer such as polyhydric alcohol organic acid ester compound, and a phosphoric acid-based plasticizer such as an organic phosphate-based plasticizer, and the like. From among the above, triethylene glycol di-2-ethyl hexanoate, triethylene glycol di-2-ethyl butyrate, tetraethylene glycol di-2-ethyl hexanoate are more preferable due to having a low propensity to hydrolysis.

[2] Heat Ray Shielding Fine Particles

The content of heat ray shielding fine particles in the dispersion liquid according to the present invention is preferably from 0.01 mass % to 50 mass %. When the content of the heat ray shielding fine particle is 0.01 mass % or more, a coating layer on a transparent substrate selected from a transparent film substrate or a transparent glass substrate, described later, and a heat ray shielding fine particle dispersion body suitable for producing a plastic molded body, or the like, can be obtained. On the other hand, industrial production of the heat ray shielding fine particle dispersion body is easy when the content of the heat ray shielding fine particles is 50 mass % or less. From these viewpoints, the content of the heat ray shielding fine particles in the organic solvent dispersion liquid is more preferably from 1 mass % to 35 mass %.

Moreover, the heat ray shielding fine particles in the medium are preferably dispersed with an average dispersed particle size of 40 nm or less. This is because when the average dispersed particle size of the heat ray shielding fine particles is 40 nm or less, optical characteristics such as haze and the like can be more favorably improved in a heat ray shielding layer produced by employing the heat ray shielding fine particle dispersion body according to the present invention.

[3] Dispersant, Coupling Agent

A dispersant, a coupling agent, and a surfactant may be selected according to the application, however preferably a group containing an amine, a hydroxyl group, a carboxyl group, or an epoxy group is included as a functional group thereof. These functional groups are adsorbed onto the surface of the composite tungsten oxide fine particles, prevent aggregation of the composite tungsten oxide fine particles, and have the effect of uniformly dispersing the heat ray shielding fine particles according to the present invention even in a heat ray shielding layer.

Preferably employed examples of dispersants include phosphate ester compounds, polymeric dispersants, silane-based coupling agents, titanate-based coupling agents, aluminum-based coupling agents, and the like, however the present invention is not limited thereto.

Specifically, the dispersant preferably includes as a functional group one or more functional groups selected from a group containing an amine, a hydroxyl group, a carboxyl group, a sulfo group, a phosphoric acid group, and an epoxy group. A dispersant including one or other of the above functional groups is adsorbed onto the surface of the composite tungsten oxide particles and/or tungsten oxide particles, and enables aggregation of the composite tungsten oxide particles and/or tungsten oxide particles to be reliably prevented. This enables the composite tungsten oxide particles and/or tungsten oxide particles in an adhesive layer to be more uniformly dispersed, and so such a dispersant can be favorably employed.

Preferable examples of the polymeric dispersant include dispersants including a main chain selected from a polyester-based, a polyether-based, a polyacrylic-based, a polyurethane-based, a polyamine-based, a polystyrene-based, and an aliphatic-based main chain, or dispersants including a main chain of two or more kinds of copolymerized unit structure selected from out of a polyester-based, a polyether-based, a polyacrylic-based, a polyurethane-based, a polyamine-based, a polystyrene-based, and an aliphatic-based unit structure.

A metal coupling agent, such as a silane-based coupling agent, a titanate-based coupling agent, an aluminum-based coupling agent, and the like may be further added to the heat ray shielding fine particle dispersion liquid so as to be employed as a dispersant.

An addition amount of the dispersant is preferably in a range from 10 parts by weight to 1000 parts by weight based on 100 parts by weight of the heat ray shielding fine particles, and more preferably in a range from 20 parts by weight to 200 parts by weight with respect thereto. When the addition amount of the dispersant is in the above range, dispersion stability is maintained such that aggregation of the heat ray shielding fine particles in the liquid does not occur.

The heat ray shielding fine particle dispersion liquid according to the present invention may also contain, if necessary, an additive agent such as an ultraviolet absorber, an antioxidant, a light-stabilizer, a tackifier, a colorant (such as a pigment or dye), an antistatic agent, or the like, in addition to a dispersant and coupling agent, and surfactant.

[4] Ultraviolet Absorber

By the heat ray shielding fine particle dispersion liquid according to the present invention further containing an ultraviolet absorber, light in the ultraviolet region can be cut further, enabling a temperature rise suppression effect to be enhanced. Moreover, including an ultraviolet absorber in the heat ray shielding fine particle dispersion liquid according to the present invention enables suppression of the influence of ultraviolet rays on people and interior decoration inside automobiles and inside buildings that have windows adhered with a near-infrared shielding film produced by employing this heat ray shielding fine particle dispersion liquid, and enables the suppression of sunburn and the deterioration of furniture, interior decoration, and the like therein.

Moreover, a light-induced discoloration phenomenon that lowers transmittance sometimes occurs with prolonged exposure to powerful ultraviolet rays in a coating layer containing the composite tungsten oxide particles and/or tungsten oxide particles that are the heat ray shielding fine particles according to the present invention. However, the light-induced discoloration phenomenon can be suppressed from occurring even when the heat ray shielding fine particle dispersion liquid according to the present invention contains an ultraviolet absorber.

There are no particular limitations to the ultraviolet absorber employed, and the ultraviolet absorber may be freely selected according to impact on the visible light transmittance and the like of the heat ray shielding fine particle dispersion liquid, ultraviolet absorption performance, resistance, and the like. The ultraviolet absorber employed may, for example, be an organic ultraviolet absorber such as a benzotriazole compound, a benzophenone compound, a salicylic acid compound, a triazine compound, a benzotriazolyl compound, a benzoyl compound or the like, or an inorganic ultraviolet absorber such as zinc oxide, titanium oxide, cerium oxide, or the like. Particularly one or more compounds selected from a benzotriazole compound and a benzophenone compound are preferably contained as the ultraviolet absorber. This is because even when a benzotriazole compound or a benzophenone compound is added at a concentration to sufficiently absorb ultraviolet rays, the visible light transmittance of the heat ray shielding fine particle dispersion liquid can still be set extremely high, and there is high resistance to prolonged exposure to powerful ultraviolet rays.

Moreover, more preferably the ultraviolet absorber contains, for example, a compound represented by the following chemical formula 1 and/or chemical formula 2.

Chemical formula 1

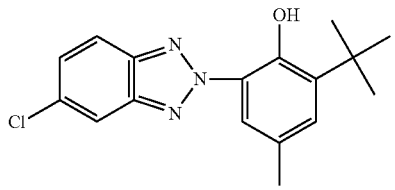

Chemical formula 2

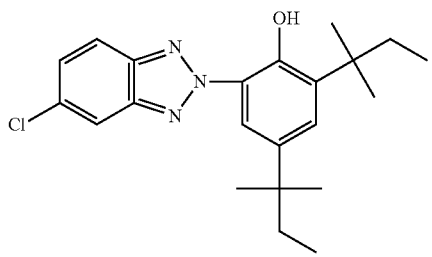

The content of the ultraviolet absorber in the heat ray shielding fine particle dispersion liquid according to the present invention is not particularly limited, and may be freely selected according to requirements for visible light transmittance, ultraviolet shielding performance, and the like. However, a content (content percent) of ultraviolet absorber in the heat ray shielding fine particle dispersion liquid is preferably, for example, from 0.02 mass % to 5.0 mass %. This is because when the ultraviolet absorber content is 0.02 mass % or more, sufficient absorption can be achieved for light in the ultraviolet region that could not be completely absorbed by the composite tungsten oxide particles. Moreover, when the content thereof is 5.0 mass % or less, the ultraviolet absorber in the heat ray shielding fine particle dispersion liquid can be more reliably prevented from precipitating, and there is no great impact on the transparency of the heat ray shielding fine particle dispersion liquid or on design characteristics.

[5] Light Stabilizer

Moreover, the heat ray shielding fine particle dispersion liquid according to the present invention may further contain a hindered amine-based light stabilizer (sometimes referred to simply as "HALS" in the present invention).

As described above, the ultraviolet absorption ability can be raised by there being an ultraviolet absorber contained in the heat ray shielding fine particle dispersion liquid and the near-infrared shielding film etc. according to the present invention. However, in environments in which the heat ray shielding fine particle dispersion liquid and the near-infrared shielding film etc. according to the present invention are employed, sometimes, depending on the type of ultraviolet absorber, the ultraviolet absorber deteriorates with prolonged use and the ultraviolet absorption ability falls. To address this issue, by the heat ray shielding fine particle dispersion liquid according to the present invention containing a HALS, deterioration of the ultraviolet absorber is prevented, enabling a contribution to be made to maintaining the ultraviolet absorption ability of the heat ray shielding fine particle dispersion liquid and the near-infrared shielding film etc. according to the present invention.

As stated above, with the near-infrared shielding film according to the present invention, sometimes a light-induced discoloration phenomenon occurs that lowers the transmittance with prolonged exposure to powerful ultraviolet rays. Thus, by employing the heat ray shielding fine particle dispersion liquid according to the present invention containing a HALS to manufacture the near-infrared shielding film, similarly to when an ultraviolet absorber or a metal coupling agent including an amino group is added, a light-induced discoloration phenomenon can be suppressed from occurring.

Note that the advantageous effect of suppressing a light-induced discoloration phenomenon by the near-infrared shielding film according to the present invention containing the HALS is based on a clearly different mechanism to the advantageous effect of suppressing a light-induced discoloration phenomenon by adding a metal coupling agent including an amino group.

This means that the advantageous effect of suppressing a light-induced discoloration phenomenon by further addition of the HALS does not conflict with the advantageous effect of suppressing a light-induced discoloration phenomenon by adding a metal coupling agent including an amino group, and instead acts in a synergistic manner.

Moreover, sometimes the HALS is itself a compound that has the ability to absorb ultraviolet rays. In such cases, adding such a compound enables the advantageous effect due to adding an ultraviolet absorber and the advantageous effect due to adding a HALS to be combined.

However, there are no particular limitations to the type of HALS to be added, and the HALS may be freely selected according to the impact on visible light transmittance and the like of the heat ray shielding fine particle dispersion liquid, compatibility with the ultraviolet absorber, ultraviolet ray resistance, and the like.

Specific preferable examples employed as the HALS include: bis(2,2,6,6-tetramethy-4-piperidyl) sebacate, bis(1, 2,2,6,6-pentamethyl-4-piperidyl) sebacate, 1-[2-[3-(3,5-t-butyl-4-hydroxyphenyl) propionyloxy] ethyl]-4-[3-(3,5-di-t-butyl-4-hydroxyphenyl) propionyloxy]-2,2,6,6-tetramethylpiperidine, 4-benzoyloxy-2,2,6,6-tetramethylpiperidine, 8-acetyl-3-dodecyl-7,7,9,9-tetramethyl-1,3,8-triazaspiro [4,5] decane-2,4-dione, bis-(1, 2,2,6,6-pentamethyl-4-piperidyl)-2-(3,5-di-t-butyl-4-hydroxybenzyl)-2-n-butylmalonate, tetrakis(1,2,2,6,6-pentamethyl-4-piperidyl)-1,2,3,4-butane tetracarboxylate, tetrakis(2,2,6,6-tetramethyl-4-piperidyl)-1,2,3,4-butane tetracarboxylate, (Mixed1,2,2,6,6-pentamethyl-4-piperidyl/tridecyl)-1,2,3,4-butane tetracarboxylate, Mixed {1,2,2,6,6-pentamethyl-4-piperidyl/β,β,β',β'-tetramethyl-3,9-[2,4,8, 10-tetraoxaspiro(5,5)undec ane] diethyl}-1,2,3,4-butane tetracarboxylate, (Mixed 2,2,6,6-tetramethyl-4-piperidyl/tridecyl)-1,2,3,4-butane tetracarboxylate, Mixed {2,2,6,6-tetramethyl-4-piperidyl/β,β,β',β'-tetramethyl-3,9-[2,4,8,10-tetraoxaspiro(5,5)undecan e] diethyl}-1,2,3,4-butane tetracarboxylate, 2,2,6,6-tetramethyl-4-piperidylmethacrylate, 1,2,2,6,6-pentamethyl-4-piperidylmethacrylate, poly [(6-(1,1,3,3-tetramethylbutyl)imino-1,3,5-triazine-2,4-diyl)] [(2,2,6,6-tetramethyl-4-piperidyl)imino] hexamethylene [(2, 2,6,6-tetramethyl-4-piperidyl)iminol], a polymer of succinic acid dimethyl and 4-hydroxy-2,2,6,6-tetramethyl-1-piperidine ethanol, N,N',N'',N'''-tetrakis-(4,6-bis-(butyl-(N-methyl-2,2,6,6-tetramethylpiperidine-4-yl)amino)-tria zine-2-yl)-4,7-diazadecane-1,10-diamine, a polycondensate of dibutylamine-1,3,5-triazine-N,N'-bis(2,2,6,6-tetramethyl-4-piperidyl-1,6-hexamethylene diamine and N-(2,2,6,6-tetramethylpiperidyl)butylamine, decane diacid bis(2,2,6,6-tetramethyl-1-(octyloxy)-4-piperidinyl) ester, and the like.

The content of HALS in the heat ray shielding fine particle dispersion liquid according to the present invention is not particularly limited, and may be freely selected according to the requirements for visible light transmittance, weather resistance, and the like of the heat ray shielding fine particle dispersion liquid. The content (content percent) of HALS in the heat ray shielding fine particle dispersion liquid is, for example, preferably from 0.05 mass % to 5.0 mass %. This is because when the content of HALS in the heat ray shielding fine particle dispersion liquid is 0.05 mass % or more, the advantageous effect of adding HALS can be sufficiently expressed by the heat ray shielding fine particle dispersion liquid. Moreover, when the content is 5.0 mass % or less, the HALS in the heat ray shielding fine particle dispersion liquid can be more reliably prevented from precipitating, and there is no great impact on the transparency of the heat ray shielding fine particle dispersion liquid or on design characteristics.

[6] Antioxidant

Moreover, the heat ray shielding fine particle dispersion liquid according to the present invention may further contain an antioxidant (oxidation inhibitor).

By the heat ray shielding fine particle dispersion liquid according to the present invention containing an antioxidant, deterioration due to oxidation is suppressed for other additives contained in the heat ray shielding fine particle dispersion liquid, such as, for example, composite tungsten oxide, oxidized tungsten, dispersant, coupling agent, surfactant, ultraviolet absorber, HALS, and the like. The weather resistance of the near-infrared shielding film etc. according to the present invention can also be further improved.

There are no particular limitations to the antioxidant, and the antioxidant may be freely selected according to the impact on visible light transmittance and the like of the heat ray shielding fine particle dispersion liquid, the desired weather resistance, and the like.

For example, a phenol-based antioxidant, a sulfur-based antioxidant, a phosphorous-based antioxidant, or the like may be preferably employed therefor.

Specific preferable examples employed as the antioxidant include: 2,6-di-t-butyl-p-cresol, butylated hydroxyanisole, 2,6-di-t-butyl-4-ethylphenol, stearyl-β-(3,5-di-t-butyl-4-hydroxyphenyl) propionate, 2,2'-methylene bis-(4-methyl-6-butylphenol), 2,2'-methylene bis-(4-ethyl-6-t-butylphenol), 4,4'-butylidene-bis-(3-methyl-6-t-butylphenol), 1,1,3-tris-(2-methyl-hydroxy-5-t-butylphenyl) butane, tetrakis [methylene-3-(3',5'-butyl-4-hydroxyphenyl)propionate] methane, 1,3,3-tris-(2-methyl-4-hydroxy-5-t-butylphenol) butane, 1,3,5-trimethyl-2,4,6-tris(3,5-di-t-butyl-4-hydroxybenzyl) benzene, and bis(3,3'-t-butylphenol)butylic acid glycolester, isooctyl-3-(3,5-di-t-butyl-4-hydroxyphenyl) propionate, and the like.

The content of antioxidant in the heat ray shielding fine particle dispersion liquid according to the present invention is not particularly limited, and the content may be freely selected according to requirements in the heat ray shielding fine particle dispersion liquid for visible light transmittance, weather resistance, and the like. However, the content (content percent) of the antioxidant in the heat ray shielding fine particle dispersion liquid according to the present invention is, for example, preferably from 0.05 mass % to 5.0 mass %. This is because when the content of the antioxidant is 0.05 mass % or more, the advantageous effect of adding an antioxidant can be sufficiently expressed in the heat ray shielding fine particle dispersion liquid. Moreover, when the content is 5.0 mass % or less, the antioxidant in the heat ray shielding fine particle dispersion liquid can be more reliably prevented from precipitating, and there is no great impact on the transparency of the heat ray shielding fine particle dispersion liquid or on design characteristics.

[7] Dispersion Treatment Method

For the heat ray shielding fine particle dispersion liquid according to the present invention, the method of treatment to disperse the heat ray shielding fine particles may be freely selected from known methods that are methods to uniformly disperse the heat ray shielding fine particles in a liquid medium and, for example, a bead mill, a ball mill, a sand mill, ultrasonic dispersion, or the like may be employed for the dispersion treatment method.

Various additives and dispersants may be added or the pH may be adjusted in order to obtain a homogeneous heat ray shielding fine particle dispersion liquid.

The heat ray shielding fine particle dispersion liquid according to the present invention in which such heat ray shielding fine particles have been dispersed in the liquid medium is placed in a suitable transparent receptacle, and light transmittance as a function of wavelength can be measured using a spectrophotometer. In the heat ray shielding fine particle dispersion liquid according to the present invention, when a visible light transmittance is 85% when computed for light absorption by the heat ray shielding fine particles alone (in the embodiments according to the present invention this is sometimes simply referred to as "visible light transmittance is 85%"), the transmittance for near-infrared light in the wavelength region from 800 nm to 900 nm is from 30% to 60%, and the average value of transmittance in the wavelength region from 1200 nm to 1500 nm is 20% or lower, and the transmittance at a wavelength of 2100 nm is 22% or lower.

Note that in these measurements, adjusting to a visible light transmittance of 85% when computed for light absorption by the heat ray shielding fine particles contained in the heat ray shielding fine particle dispersion liquid alone is easily performed by diluting with the dispersion solvent or an appropriate solvent compatible with the dispersion solvent.

As described above, the heat ray shielding fine particle dispersion liquid according to the present invention preferably has high transparency and near-infrared shielding performance. The transparency and the near-infrared shielding performance, namely the heat shielding characteristics, of the heat ray shielding fine particle dispersion liquid can be respectively evaluated by the visible light transmittance, the average value of transmittance in the wavelength region from 1200 nm to 1500 nm, and the transmittance at a wavelength of 2100 nm.

As described above, compared to the light transmittance profile when the composite tungsten oxide fine particles disclosed in patent document 4 and patent document 5 are employed, the light transmittance profile for the heat ray shielding fine particle dispersion liquid according to the present invention, whilst not having a large rise in the transmittance in the wavelength region from 1200 nm to 1500 nm, has a transmittance of near-infrared light in the range in the wavelength region from 800 nm to 900 nm and improved heat ray absorption ability at a wavelength of 2100 nm.

[d] Heat Ray Shielding Film and Heat Ray Shielding Glass Producing Method

The heat ray shielding film or the heat ray shielding glass can be produced by employing the heat ray shielding fine particle dispersion liquid described above, and forming a coating layer containing the heat ray shielding fine particles on a transparent substrate selected from a film substrate or a glass substrate.

The heat ray shielding film or the heat ray shielding glass can be produced by preparing a coating solution by mixing the above heat ray shielding fine particle dispersion liquid with plastic or a monomer to form a coating layer on the transparent substrate using a known method.

For example, the heat ray shielding film can be prepared as follows.

A binder resin is added to this heat ray shielding fine particle dispersion liquid to obtain a coating solution.

After the surface of the film substrate has been coated with this coating solution, the solvent is evaporated and the resin is cured by a predetermined method, thereby enabling a coating layer with the heat ray shielding fine particles dispersed in the medium to be formed.

The binder resin of the coating layer is, for example, be selectable according to purpose from out of a UV curing resin, a thermosetting resin, an electron beam curable resin, a room temperature curable resin, a thermoplastic resin, or the like. Specific examples thereof include polyethylene resins, polyvinyl chloride resins, polyvinylidene chloride resins, polyvinyl alcohol resins, polystyrene resins, polypropylene resins, ethylene vinyl acetate copolymers, polyester resins, polyethylene terephthalate resins, fluorine resins, polycarbonate resins, acrylic resins, and polyvinyl butyral resins.

These resins may be used alone or in combination. However, among these coating layer binders, a UV curing resin binder is particularly preferably employed from the viewpoint of productivity, device cost, and the like.

Moreover, a binder using a metal alkoxide may also be utilized therefor. Typical alkoxides for use as the metal alkoxide include alkoxides of Si, Ti, Al, Zr, and the like. Binders in which a metal alkoxide is employed can be hydrolyzed/polycondensed by heating or the like so as to enable a coating layer composed of an oxide film to be formed.

Note that this film substrate is not limited to a film shape, and may, for example, be a board shape or may be a sheet shape. Various materials may be employed as material for the film substrate according to purpose, such as PET, acrylic, urethane, polycarbonate, polyethylene, ethylene vinyl acetate copolymer, vinyl chloride, a fluorine resin, or the like. However, the heat ray shielding film is preferably a polyester film and is more preferably a PET film.

Moreover, the surface of the film substrate is preferably subjected to a surface treatment in order to realize easy adhesion of the coating layer. Moreover, in order to improve the adhesion properties between the coating layer and either the glass substrate or the film substrate, an intermediate layer is preferably formed on the glass substrate or on the film substrate, with the coating layer then formed on the intermediate layer. The composition of the intermediate layer is not particularly limited, and, for example, the intermediate layer may be configured by a polymer film, a metal layer, an inorganic layer (for example, an inorganic oxide layer such as silica, titania, zirconia, or the like), an organic/inorganic composite layer, or the like.

The method for providing the coating layer on the film substrate or the glass substrate is not particularly limited, as long as it is a method capable of uniformly coating the surface of the substrate with the heat ray shielding fine particle-containing dispersion liquid. Examples of methods that may be used therefore include a bar coating method, a gravure coating method, a spray coating method, a dip coating method, or the like.

For example, for a bar coating method using a UV curing resin, a coating solution having appropriate leveling properties may be prepared by appropriately adjusting the solution concentration, additives, and the like, then employing a wire bar, of a bar number capable of appropriately satisfying the coating layer thickness and the content of the heat ray shielding fine particles, to form a coating layer on the film substrate or the glass substrate. Then, the coating layer can be formed on the film substrate or the glass substrate by removing an organic solvent contained in the coating solution by drying, and then curing by irradiating with ultraviolet light. When doing so, although the drying conditions for the coating layer differ depending on the components, and the type and usage ratio of the solvent, the drying conditions are normally about from 20 seconds to 10 minutes at a temperature from 60° C. to 140° C. There are no particular limitations to the irradiation with ultraviolet light and, for example, this can be performed suitably by employing an UV exposure machine such as an ultrahigh pressure mercury lamp or the like.

In addition, the adhesion properties between the substrate and the coating layer, the smoothness of the coating layer during coating, the drying properties of the organic solvent, and the like, can be manipulated by steps before and after forming the coating layer. For example, a substrate surface treatment step, a pre-bake (preheating of the substrate) step, a post-bake (post-heating of the substrate) step, and the like may be appropriately selected as the steps before and after. The heating temperature in the pre-bake step and/or post-bake step is preferably from 80° C. to 200° C., and the heating time thereof is preferably from 30 seconds to 240 seconds.

The thickness of the coating layer on the film substrate or on the glass substrate is not particularly limited, but in practice is preferably 10 µm or less, and more preferably 6 µm or less. This is because when the thickness of the coating layer is 10 µm or less, sufficient pencil hardness is exhibited to give scratch resistance, and in addition, processing problems, such as the occurrence of warping in the film substrate when the solvent in the coating layer is being evaporated and the binder is being cured, can be avoided.

The content of the heat ray shielding fine particles contained in the coating layer is not particularly limited, however the content per projected surface area of the film/glass/coating layer is preferably from 0.1 $g/m^2$ to 5.0 $g/m^2$. This is because when the content is 0.1 $g/m^2$ or more, significantly enhanced heat ray shielding properties can be exhibited compared to cases in which there are no heat ray shielding fine particles contained, and when the content is 5.0 $g/m^2$ or less the visible light transparency of the heat ray shielding film/glass/coating layer is sufficiently maintained.

The produced heat ray shielding film and heat ray shielding glass have optical properties in which, when the visible light transmittance is 70%, the transmittance at a wavelength of 850 nm is from 23% to 45%, and the average value of transmittance in the wavelength region from 1200 nm to 1500 nm is 20% or lower. Note that the visible light transmittance is easily adjusted to 70% by adjusting the concentration of the heat ray shielding fine particles in the coating solution, or by adjusting the layer thickness of the coating layer.

Compared to a transmission profile in a case of using the composite tungsten oxide fine particles of the conventional technique generally having a composition equivalent to the composition of the present invention except for the element M, limit values in the above-described transmission profile of the present invention shows that a visible light transmission band is broadened toward a longer wavelength side without greatly increasing the average value of the transmittance that exists in the range of 1200 to 1500 nm, and a higher transmittance in the range from 800 to 900 nm is observed. The above limit values in the transmittance profile have a fixed width when composite tungsten oxide fine particles of the same composition and concentration are employed. However, note that they are liable to change depending on the size and shape of the fine particles, the aggregation state thereof, and the refractive index and the like of the dispersant-containing dispersion solvent.

Moreover, in order to impart further ultraviolet shielding functionality to the heat ray shielding film and the heat ray shielding glass according to the present invention, at least one kind of particle may be added from inorganic particles such as oxidized tungsten, zinc oxide, cerium oxide, etc., or organic particles such as benzophenone, benzotriazole, or the like.

Moreover, in order to raise the visible light transmittance of the heat ray shielding film and the heat ray shielding glass according to the present invention, particles of ATO, ITO, aluminum doped zinc oxide, indium-tin composite oxide, and the like may be further mixed into the coating layer. Adding such transparent particles to the coating layer increases the transmittance in the vicinity of a wavelength of 750 nm, while shielding infrared light of longer wavelengths than 1200 nm, so as to obtain a heat ray shielding body with high transmittance of near-infrared light and high heat ray shielding properties.

The heat ray shielding film or the heat ray shielding glass according to the present invention have optical properties in which, when the visible light transmittance is 70%, the average value of transmittance at wavelengths from 800 nm to 900 nm is from 13% to 40%, and the average value of transmittance in the wavelength region from 1200 nm to 1500 nm is 8% or lower, and the transmittance at a wavelength of 2100 nm is 5% or lower.

The visible light transmittance is easily adjusted to 70% by adjusting the concentration of the heat ray shielding fine particles contained in an organic solvent dispersion liquid, a dispersed powder, a plasticizer dispersion liquid, or a master batch, or by adjusting the amount of the heat ray shielding fine particles, dispersed powder, plasticizer dispersion liquid, or master batch added when preparing a resin composition, or furthermore by adjusting the layer thickness of film, or the like.

The shape of the transmittance profile of the heat ray shielding fine particles according to the present invention as described above has, in comparison to the transmittance profile in cases employing composite tungsten oxide fine particles of the conventional technique, been found to have the following characteristics.

1) For the heat ray shielding fine particles according to the present invention, the region of the visible light transmission band is spread out to a region in the wavelength region from 800 nm to 900 nm, which is a near-infrared light region, and there is a high transmittance in this region.

2) For the heat ray shielding fine particles according to the present invention, the value of the average value of transmittance in the wavelength region from 1200 nm to 1500 nm is hardly changed.

3) The heat ray shielding fine particles according to the present invention had heat ray shielding performance at the wavelength of 2100 nm.

[e] Heat Ray Shielding Fine Particle Dispersion Body Producing Method

Explanation follows, in sequence, regarding a method for producing the heat ray shielding fine particle dispersion body, under the headings: [1] Granule Shaped Heat Ray Shielding Fine Particle Dispersion Body; [2] Sheet Shaped or Film Shaped Heat Ray Shielding Fine Particle Dispersion Body (Heat Ray Shielding Film, Heat Ray Shielding Sheet).

[1] Granule Shaped Heat Ray Shielding Fine Particle Dispersion Body

The dispersed powder and the plasticizer dispersion liquid according to the present invention, in which the heat ray shielding fine particles are dispersed in a dispersant, can be obtained by removing the organic solvent from the above heat ray shielding fine particle dispersion liquid described employing an organic solvent as the medium. Moreover, more dispersant or the like can be added to the above heat ray shielding fine particle dispersion liquid according to the required characteristics of the dispersed powder and the plasticizer dispersion liquid.

Preferably reduced pressure drying of the heat ray shielding fine particle dispersion liquid is employed as the method for removing the organic solvent from the above heat ray shielding fine particle dispersion liquid. Specifically, reduced pressure drying is performed while stirring the heat ray shielding fine particle dispersion liquid so as to separate the heat ray shielding fine particle-containing composition and the organic solvent component. A vacuum mixer dryer may be employed as the device used for such reduced pressure drying. However, any device having such functionality may be employed, and there are no particularly limitations thereto. The value of pressure during a reduced pressure drying step may be selected as appropriate.

Using such a reduced pressure drying method not only improves the efficiency of removing the organic solvent from the heat ray shielding fine particle dispersion liquid, but also means that the dispersed powder and the plasticizer dispersion liquid according to the present invention are not exposed to a high temperature for a long time. This is preferable so as not to cause aggregation of the heat ray shielding fine particles dispersed in the dispersed powder or in the plasticizer dispersion liquid. Further, productivity is raised for the dispersed powder and the plasticizer dispersion liquid, and it is easy to recover the evaporated organic solvent, which is also preferable from environmental considerations.

Residual organic solvent in the dispersed powder and the plasticizer dispersion liquid according to the present invention obtained after the drying step is preferably 5 mass % or less. This is because when the residual organic solvent is 5 mass % or less, bubbles are not generated when the dispersed powder and the plasticizer dispersion liquid are processed into a heat ray shielding laminated transparent substrate, and good appearance and optical properties are maintained.

Further, a master batch according to the present invention can be obtained by dispersing the heat ray shielding fine particles, the dispersed powder, or the plasticizer dispersion liquid in a resin, and then pelletizing the resin.

Further, a master batch can also be obtained by uniformly mixing the heat ray shielding fine particles, the dispersed powder, and the plasticizer dispersion liquid with granules or pellets of a thermoplastic resin, and, if necessary, other additives, then kneading the mixture using a vent type single-screw or twin-screw extruder, and processing the mixture into pellets by a normal method in which strands that have been melt-extruded are then cut. Examples of shapes that may be employed in such cases include a cylindrical shape or a polygonal pillar shape. Further, a so-called hot cut method may also be employed in which a molten extrudate is cut directly. In such cases an approximately spherical shape is normally achieved.

As well as a dispersant and coupling agent, and surfactant being added to the granule shaped heat ray shielding fine particle dispersion body according to the present invention, if necessary, an additive or the like such as an ultraviolet absorber, an antioxidant, a light-stabilizer, a tackifier, a colorant (such as a pigment or dye), an antistatic agent, or the like may be added thereto.

The heat ray shielding fine particle dispersion body according to the present invention is able to further cut light in the ultraviolet region due to additionally containing an ultraviolet absorber, enabling the temperature rise suppression effect to be improved. Moreover, the heat ray shielding fine particle dispersion body according to the present invention containing an ultraviolet absorber enables suppression of the effects of ultraviolet rays on people and the interior decoration inside automobiles and buildings that have the heat ray shielding film or the heat ray shielding sheet produced by employing the heat ray shielding fine particle dispersion body according to the present invention adhered to their windows, and enables the suppression of sunburn and the deterioration of furniture, interior decoration, and the like.

Moreover, in the heat ray shielding film or the heat ray shielding sheet containing the composite tungsten oxide particles and/or tungsten oxide particles that are the heat ray shielding fine particles according to the present invention, a light-induced discoloration phenomenon sometimes occurs that lowers the transmittance with prolonged exposure to powerful ultraviolet rays. However, the light-induced discoloration phenomenon can also be suppressed from occurring when the heat ray shielding fine particle dispersion liquid according to the present invention also contains an ultraviolet absorber.

There is no particular limitation to the ultraviolet absorber, and it may be freely selected according to the influence on the visible light transmittance and the like of the heat ray shielding film and heat ray shielding sheet produced by employing the heat ray shielding fine particle dispersion body according to the present invention, and according to ultraviolet absorption performance, weather resistance, and the like.

Ultraviolet absorbers listed under [4] Ultraviolet Absorbers in [c] Heat Ray Shielding Fine Particle Dispersion Liquid and Producing Method Thereof may be employed as the ultraviolet absorber.

The content of ultraviolet absorber in the heat ray shielding fine particle dispersion body according to the present invention is not particularly limited, and may be freely selected according to the required visible light transmittance, ultraviolet shielding performance, and the like. However, the content (content percent) of ultraviolet absorber in the heat ray shielding fine particle dispersion body is, for example, preferably from 0.02 mass % to 5.0 mass %. This is because when the ultraviolet absorber content is 0.02 mass % or more, there is sufficient absorption for light in the ultraviolet region that could not be completely absorbed by the composite tungsten oxide particles. Moreover, when the content thereof is 5.0 mass % or less, the ultraviolet absorber in the heat ray shielding fine particle dispersion body is more reliably prevented from precipitating, and there is no great impact on the transparency and design characteristics of the heat ray shielding film and heat ray shielding sheet produced by employing the heat ray shielding fine particle dispersion body.

Moreover, the heat ray shielding fine particle dispersion body according to the present invention may further contain a hindered amine-based light stabilizer (sometimes referred to as "HALS" in the present invention).

As described above, the ultraviolet absorption ability can be raised by the near-infrared shielding film etc. produced by employing the heat ray shielding fine particle dispersion body according to the present invention containing an ultraviolet absorber.

However, in environments in which the near-infrared shielding film etc. produced by employing the heat ray shielding fine particle dispersion body according to the present invention are actually employed, sometimes, depending on the type of ultraviolet absorber, the ultraviolet absorber deteriorates with prolonged use and ultraviolet absorption ability falls. To address this issue, by the heat ray shielding fine particle dispersion body according to the present invention containing a HALS, deterioration of the ultraviolet absorber is prevented, enabling a contribution to be made to maintaining the ultraviolet absorption ability of the heat ray shielding fine particle dispersion body and the near-infrared shielding film etc. according to the present invention.

Moreover, as described above, in the near-infrared shielding film according to the present invention, sometimes a light-induced discoloration phenomenon occurs that lowers transmittance with prolonged exposure to powerful ultraviolet rays. However, the light-induced discoloration phenomenon can also be suppressed from occurring even when the near-infrared shielding film etc. is produced by making the heat ray shielding fine particle dispersion body according to the present invention contain a HALS, similarly to when an ultraviolet absorber and a metal coupling agent including an amino group are added thereto.

Note that the advantageous effect of suppressing the light-induced discoloration phenomenon from occurring by the heat ray shielding fine particle dispersion body according to the present invention containing the HALS is based on a clearly different mechanism to the advantageous effect of suppressing a light-induced discoloration phenomenon from occurring by adding a metal coupling agent including an amino group.

This means that the advantageous effect of suppressing a light-induced discoloration phenomenon by further addition of the HALS does not conflict with the advantageous effect of suppressing a light-induced discoloration phenomenon from occurring by adding a metal coupling agent including an amino group, and is instead acts in a synergistic manner.

Moreover, sometimes the HALS is itself a compound that has the ability to absorb ultraviolet rays. In such cases, the advantageous effect due to adding the ultraviolet absorber and the advantageous effect due to adding a HALS can be combined by adding such a compound.

However, there are no particular limitations to the type of HALS to be added, and the HALS may be freely selected according to the impact on visible light transmittance and the like of the near-infrared shielding film etc. employing the heat ray shielding fine particle dispersion body, compatibility with the ultraviolet absorber, ultraviolet ray resistance, and the like.

HALS listed under [5] Light-Stabilizer in [c] Heat Ray Shielding Fine Particle Dispersion Liquid and Producing Method Thereof can be employed as the HALS.

The content of HALS in the heat ray shielding fine particle dispersion body according to the present invention is not particularly limited, and may be freely selected according to the requirements for visible light transmittance, weather resistance, and the like in the near-infrared shielding film by employing the heat ray shielding fine particle dispersion body. The content (content percent) of HALS in the heat ray shielding fine particle dispersion body is, for example, preferably from 0.05 mass % to 5.0 mass %. This is because when the HALS content in the heat ray shielding fine particle dispersion body is 0.05 mass % or more, sufficient effect from adding the HALS can be exhibited by the near-infrared shielding film etc. produced by employing the heat ray shielding fine particle dispersion body. Moreover, when the content thereof is 5.0 mass % or less, the HALS in the heat ray shielding fine particle dispersion body can be more reliably prevented from precipitating, and there is no great impact on the transparency and design characteristics of the near-infrared shielding film etc. produced by employing the heat ray shielding fine particle dispersion body.

Moreover, the heat ray shielding fine particle dispersion body of the present embodiment may further contain an antioxidant (oxidation inhibitor).

By the heat ray shielding fine particle dispersion body according to the present invention containing an antioxidant, deterioration due to oxidation is suppressed for other additives contained in the heat ray shielding fine particle dispersion body, such as, for example, the composite tungsten oxide, oxidized tungsten, dispersant, coupling agent, surfactant, ultraviolet absorber, HALS, and the like, and the weather resistance of the near-infrared shielding film etc. according to the present invention can be further improved.

There are no particular limitations to the antioxidant, and the antioxidant may be freely selected according to the impact on visible light transmittance and the like of the near-infrared shielding film etc. employing the heat ray shielding fine particle dispersion body, the desired weather resistance, and the like.

For example, a phenol-based antioxidant, a sulfur-based antioxidant, a phosphorous-based antioxidant, or the like can be preferably employed therefor.

The antioxidants listed under [6] Antioxidants in [c] Heat Ray Shielding Fine Particle Dispersion Liquid and Producing Method Thereof may be employed as the antioxidant.

The content of antioxidant in the heat ray shielding fine particle dispersion body according to the present invention is not particularly limited, and may be freely selected according to the requirements for visible light transmittance, weather resistance, and the like in the near-infrared shielding film etc. employing the heat ray shielding fine particle dispersion body. However, the content (content percent) of the antioxidant in the heat ray shielding fine particle dispersion body according to the present invention is, for example, preferably from 0.05 mass % to 5.0 mass %. This is because when the content of the antioxidant is 0.05 mass % or more the advantageous effect of adding the antioxidant can be sufficiently expressed in the near-infrared shielding film etc. employing the heat ray shielding fine particle dispersion body. Moreover, when the content is 5.0 mass % or less, the antioxidant in the heat ray shielding fine particle dispersion body can be more reliably prevented from precipitating, and there is no great impact on the transparency and design characteristics of the near-infrared shielding film etc. employing the heat ray shielding fine particle dispersion body.

As described above, the near-infrared shielding film etc. employing the heat ray shielding fine particle dispersion body according to the present invention preferably has high transparency and near-infrared shielding performance. The transparency and the near-infrared shielding performance, namely the heat shielding characteristics, of the near-infrared shielding film etc. can be respectively evaluated by the visible light transmittance, the average value of transmittance in the wavelength region from 1200 nm to 1500 nm, and the transmittance at a wavelength of 2100 nm.

[2] Sheet Shaped or Film Shaped Heat Ray Shielding Fine Particle Dispersion Body A sheet shaped or film shaped heat ray shielding fine particle dispersion body according to the present invention can be produced by uniformly mixing the dispersed powder, plasticizer dispersion liquid, or master batch according to the present invention into a transparent resin. A heat ray shielding sheet and a heat ray shielding film can be produced from a sheet shaped or film shaped heat ray shielding fine particle dispersion body by securing the heat ray shielding properties possessed by composite tungsten oxide fine particles of the conventional technique, and raising the transmittance of near-infrared light in the wavelength region from 800 nm to 900 nm.

When producing the heat ray shielding sheet or the heat ray shielding film according to the present invention, various thermoplastic resins can be employed as the resin to configure such a sheet or film. Taking into consideration that the heat ray shielding sheet and the heat ray shielding film according to the present invention will be applied to various types of window material, the thermoplastic resin preferably has sufficient transparency.

Specifically, a preferable resin can be selected from: a resin selected from a resin group consisting of a polyethylene terephthalate resin, a polycarbonate resin, an acrylic resin, a styrene resin, a polyamide resin, a polyethylene resin, a vinyl chloride resin, an olefin resin, an epoxy resin, a polyimide resin, a fluororesin, and an ethylene/vinyl acetate copolymer; or a mixture of two or more resins selected from the above resin group; or a copolymer of two or more resins selected from the above resin group.

Moreover, when the heat ray shielding sheet according to the present invention is used as-is as a board shaped window material, in consideration of the viewpoints of high transparency and general characteristics demanded of a window material, namely rigidity, light weight, long-term durability, cost, and the like, preferably a polyethylene terephthalate resin, a polycarbonate resin, or an acrylic resin is employed therefor, and more preferable a polycarbonate resin is employed therefor.

Moreover, when the heat ray shielding sheet and the heat ray shielding film according to the present invention are used as an intermediate layer in a heat ray shielding laminated glass, described later, when considered from the perspectives of adhesion properties to the transparent substrate, weather resistance, penetration resistance, and the like, a polyvinyl acetal resin and an ethylene/vinyl acetate copolymer are preferable employed therefor, and a polyvinyl butyral resin is more preferable employed therefor.

Moreover, in cases in which the heat ray shielding sheet or the heat ray shielding film is used as an intermediate layer, a plasticizer is preferably further added when the thermoplastic resin configuring the sheet or film does not in itself have sufficient softness and adhesion properties to the transparent substrate, such as, for example, when the thermoplastic resin is a polyvinyl acetal resin.

The substances used as the plasticizers for the thermoplastic resin according to the present invention may be employed as such a plasticizer. For example, plasticizers that may be employed for a heat ray shielding film configured from a polyvinyl acetal resin include ester-based plasticizers such as a plasticizer that is a compound of a monohydric alcohol and an organic acid ester, polyhydric alcohol organic acid ester compound, and the like, and a phosphoric acid-based plasticizer such as an organic phosphate-based plasticizer, and the like. All these plasticizers are preferably liquid at room temperature. From among these, a plasticizer that is an ester compound synthesized from a polyhydric alcohol and a fatty acid is preferable.

The heat ray shielding sheet can be produced by kneading the dispersed powder or plasticizer dispersion liquid or master batch with the thermoplastic resin and, optionally, a plasticizer or another additive, then using a known method, such as an extrusion molding method, injection molding method, or the like to mold the kneaded mixture into, for example, a sheet member having a flat surface profile or a curved surface profile.

A known method may be employed as the method for forming the heat ray shielding sheet and the heat ray shielding film. For example, a calendar roll method, an extrusion method, a casting method, an inflation method, or the like can be used.

[f] Heat Ray Shielding Laminated Transparent Substrate Producing Method

Explanation follows regarding a heat ray shielding laminated transparent substrate formed by interposing the heat ray shielding sheet and the heat ray shielding film according to the present invention as an intermediate layer between plural sheets of transparent substrate made from a glass sheet or a plastic material.

The heat ray shielding laminated transparent substrate according to the present invention is laminated by using a transparent substrate to sandwich an intermediate layer from both sides. Examples of the transparent substrate include glass sheets, or sheet shaped plastic or film shaped plastic transparent in the visible light region. The plastic material is not particularly limited, and the plastic material is selectable according to the application. For example, when employed in a transport vehicle such as an automobile, from the perspectives of securing visibility for the driver and passengers of the transport vehicle, a transparent resin is preferable, such as a polycarbonate resin, an acrylic resin, and a polyethylene terephthalate resin, and a PET resin, polyamide resin, a vinyl chloride resin, olefin resin, an epoxy resin, a polyimide resin, a fluororesin, and the like may also be employed therefor.

The heat ray shielding laminated transparent substrate according to the present invention may also be obtained by disposing plural inorganic glass sheets facing each other with the heat ray shielding sheet and heat ray shielding film according to the present invention interposed therebetween, and then using a known method to laminate these together so as to form an integrated body. The heat ray shielding laminated inorganic glass obtained thereby is mainly employed as an inorganic glass in the front of an automobile and as windows in buildings.

There are no particular limitations to the concentration of the heat ray shielding fine particles contained in the heat ray shielding sheet, the heat ray shielding film, and the heat ray shielding laminated transparent substrate according to the present invention. However, the content per projected surface area of the sheet/film is preferably from 0.1 $g/m^2$ to 5.0 $g/m^2$. This is because when the content is 0.1 $g/m^2$ or more, significantly enhanced heat ray shielding properties can be exhibited compared to cases in which no heat ray shielding fine particles are contained, and the visible light transparency of the heat ray shielding sheet/film is not totally lost when the content is 5.0 $g/m^2$ or less.

The optical properties of the heat ray shielding film or heat ray shielding glass according to the present invention are such that when the visible light transmittance is 70%, the average value of transmittance at wavelengths from 800 nm to 900 nm is from 12% to 40%, and the average value of transmittance in the wavelength region from 1200 nm to 1500 nm is 8% or lower, and the transmittance at a wavelength of 2100 nm is 8.0% or lower.

Moreover, the optical properties of the heat ray shielding sheet according to the present invention are such that when the visible light transmittance is 70%, the average value of transmittance at wavelengths from 800 nm to 900 nm is from 12% to 40%, and the average value of transmittance in the wavelength region from 1200 nm to 1500 nm is 8% or lower, and the transmittance at a wavelength of 2100 nm is 8.0% or lower.

Moreover, the optical properties of the heat ray shielding laminated structural body according to the present invention are such that when the visible light transmittance is 70%, the average value of transmittance at wavelengths from 800 nm to 900 nm is from 12% to 40%, and the average value of transmittance in the wavelength region from 1200 nm to 1500 nm is 8% or lower, and the transmittance at a wavelength of 2100 nm is 8.0% or lower.

Adjustment to a visible light transmittance of 70% is easily performed by adjusting the concentration of the heat ray shielding fine particles contained in the heat ray shielding fine particle dispersion liquid, the dispersed powder, the plasticizer dispersion liquid, or the master batch as described above, by adjusting the addition amounts of the heat ray shielding fine particles, the dispersed powder, the plasticizer dispersion liquid, or the master batch when preparing the resin composition, or furthermore by adjusting the layer thickness of the film and sheet or the like.

The shape of the transmittance profile of the heat ray shielding fine particles according to the present invention has been found to have the following characteristics, in comparison to the transmittance profile in cases employing composite tungsten oxide fine particles of the conventional technique.

1. For the heat ray shielding fine particles according to the present invention, the region of the visible light transmission band is spread out to a region in the wavelength region from 800 nm to 900 nm, which is a near-infrared light region, and there is a high transmittance in this region.
2. For the heat ray shielding fine particles according to the present invention, the value of the average value of transmittance in the wavelength region from 1200 nm to 1500 nm is hardly changed.
3. The heat ray shielding fine particles according to the present invention had heat ray shielding performance at the wavelength of 2100 nm.

EXAMPLES

Specific explanation of the present invention follows, with reference to examples.

However, the present invention is not limited to the following examples.

The powder color of the heat ray shielding fine particles was measured for Examples 1 to 3 and Comparative Example 1 using a spectrophotometer U-4100, produced by Hitachi, Ltd., and evaluated in L*a*b* color space.

The transmittance for light in the wavelength region from 300 nm to 2100 nm was measured for the heat ray shielding fine particle dispersion liquids of Examples 1 to 3 and Comparative Example 1 using the spectrophotometer U-4100, produced by Hitachi, Ltd, while the dispersion liquids were held in a spectrophotometer cell (model number: S10-SQ-1, material: synthetic quartz, optical path length: 1 mm, produced by GL Sciences, Inc.).

When performing these measurements, transmittance was measured in a state in which the cell was filled with the solvent of the dispersion liquid(methyl isobutylketone) to find a baseline transmittance measurement. As a result, the influence of light reflection at the spectrophotometer cell surfaces and of light absorption by the solvent is eliminated from the spectral transmittance and visible light transmittance, as explained below, such that light absorption is computed for the heat ray shielding fine particles alone.

Specifically, the transmittance can be found for when the visible light transmittance is 85% by using the following procedure.

First, a transmittance T1 ($\lambda$) is measured for the spectrophotometer cell filled with the methyl isobutyl ketone. Then a transmittance T2 ($\lambda$) is measured for the spectrophotometer cell filled with a dispersion liquid containing the heat ray absorbing fine particles. Then T2 ($\lambda$) is divided by Ti ($\lambda$), as expressed by Equation 2.

$$T3(\lambda)=100 \times T2(\lambda)/T1(\lambda) \qquad \text{Equation 2}$$

T3 ($\lambda$) is the transmittance curve for the heat ray absorbing fine particles from which the influence of absorption and reflection of the substrate has been eliminated. Note that $\lambda$ denotes wavelength.

Thus, a transmittance curve T4 ($\lambda$) for when the visible light transmittance is 85% can be computed from Lambert-Beer's law according to Equation 3.

$$T4(\lambda)=100 \times (T3(\lambda)/100)\hat{\ }a \qquad \text{Equation 3}$$

Wherein "^" is a mathematical symbol meaning power of, with A^B meaning "A to the power B". Moreover, "a" is a real-valued variable. A specific values of a is determined so as to give a visible light transmittance of 85% as computed based on T4 ($\lambda$) in accordance with JIS R 3106.

Moreover, the average dispersed particle size of the heat ray shielding fine particles was measured using a particle distribution analyzer: Microtrac, produced by Nikkiso Co., Ltd.

The average particle size of the heat ray shielding fine particles was measured using a particle distribution analyzer: Microtrac, produced by Nikkiso Co., Ltd.

The transmittance of the heat ray shielding film, the heat ray shielding glass, the heat ray shielding sheet and the laminated transparent substrate for each example of Examples 4 to 16 and Comparative Examples 4 to 6 was measured using the spectrophotometer U-4100, produced by Hitachi, Ltd., and the visible light transmittance was computed in accordance with JIS R 3106:1998 based on the transmittance measured for light in the wavelength region from 300 nm to 2100 nm.

The transmittance of the heat ray shielding sheet, the heat ray shielding film, the heat ray shielding laminated glass sheet and laminated transparent substrate for each example of Examples 1 to 8 and Comparative Examples 1 to 3 was measured using the spectrophotometer U-4100, produced by Hitachi, Ltd., and the visible light transmittance was computed in accordance with JIS R 3106:1998 based on the transmittance measured for light in the wavelength region from 300 nm to 2100 nm.

[Example 1] MIBK Dispersion Liquid of $C_{s0.30}WO_3$

Powders of tungstic acid ($H_2WO_4$) and caesium hydroxide (CsOH) were weighed out at a ratio equivalent to Cs/W (mol ratio)=0.30/1.00, and thoroughly mixed in an agate mortar to obtain a mixed powder. The mixed powder was heated under a 0.3% $H_2$ gas supply using $N_2$ gas as a carrier, and after performing reduction treatment at a temperature of 500° C. for 4 hours, the mixed powder was fired for 1 hour under an $N_2$ gas atmosphere at 800° C., thereby obtaining a caesium tungsten bronze powder having a hexagonal crystal structure with a lattice constant on the a-axis of 7.4131 Å, a lattice constant on the c-axis of 7.5885 Å, and having a powder color expressed in L*a*b* color space of L* 41.86, a* −2.90, and b* −6.76 (hereinafter abbreviated to "powder A"). The measurement results are listed in Table 1.

20 mass % of the powder A, 10 mass % of an acrylic based polymeric dispersant having a group containing an amine as a functional group (acrylic based dispersant having an amine number of 48 mg KOH/g, and decomposition temperature of 250° C. (hereinafter abbreviated to "dispersant a"), and 70 mass % of methyl isobutyl ketone were weighed out. These were loaded into a paint shaker containing 0.3 mm φ $ZrO_2$ beads, and pulverized/dispersed for 10 hours to obtain a heat ray shielding fine particle dispersion liquid (hereinafter abbreviated to "dispersion liquid A"). The average dispersed particle size of the heat ray shielding fine particles in the dispersion liquid A was measured and found to be 25 nm.

The dispersion liquid A was suitably diluted with MIBK, placed in a 10 mm thick rectangular receptacle, and the spectral transmittance measured. The transmittance profile measured when the dilution ratio had been adjusted to give a visible light transmittance of 85% gave an average value of transmittance for wavelengths from 800 nm to 900 nm of 45.5%, an average value of transmittance for wavelengths from 1200 nm to 1500 nm of 12.8%, and a transmittance at a wavelength of 2100 nm of 15.5%. This confirmed that clearly the visible light transmission band was widened and the heat ray shielding performance improved at the wavelength of 2100 nm, in comparison to caesium tungsten bronze produced by a conventional method illustrated in Comparative Example 1 below. The measurement results for powder color of the powder A are listed in Table 1, and the measurement results for transmittance are listed in Table 2 and FIG. 1.

50 parts by weight of Aronix UV-3701 (referred to below as UV-3701) produced by Toagosei Co., Ltd., which is an ultraviolet curing resin for hard coating, was mixed with 100 parts by weight of the dispersion liquid A to obtain a heat ray shielding fine particle coating solution (referred to below as coating solution A). This coating solution was applied onto a PET film (HPE-50 produced by Teijin) using a bar coater, so as to thereby form a coating layer. Note that the same PET film was used in the other examples and comparative examples. The PET film provided with the coating layer was dried at 80° C. for 60 seconds to evaporate the solvent and then cured with a high pressure mercury lamp, to thereby prepare a heat ray shielding film provided with a coating layer containing the heat ray shielding fine particles.

In the heat ray shielding film preparation described above, the heat ray shielding fine particle concentration in the coating solution and the layer thickness of the coating layer were adjusted such that the visible light transmittance was 70%.

Figure 2:
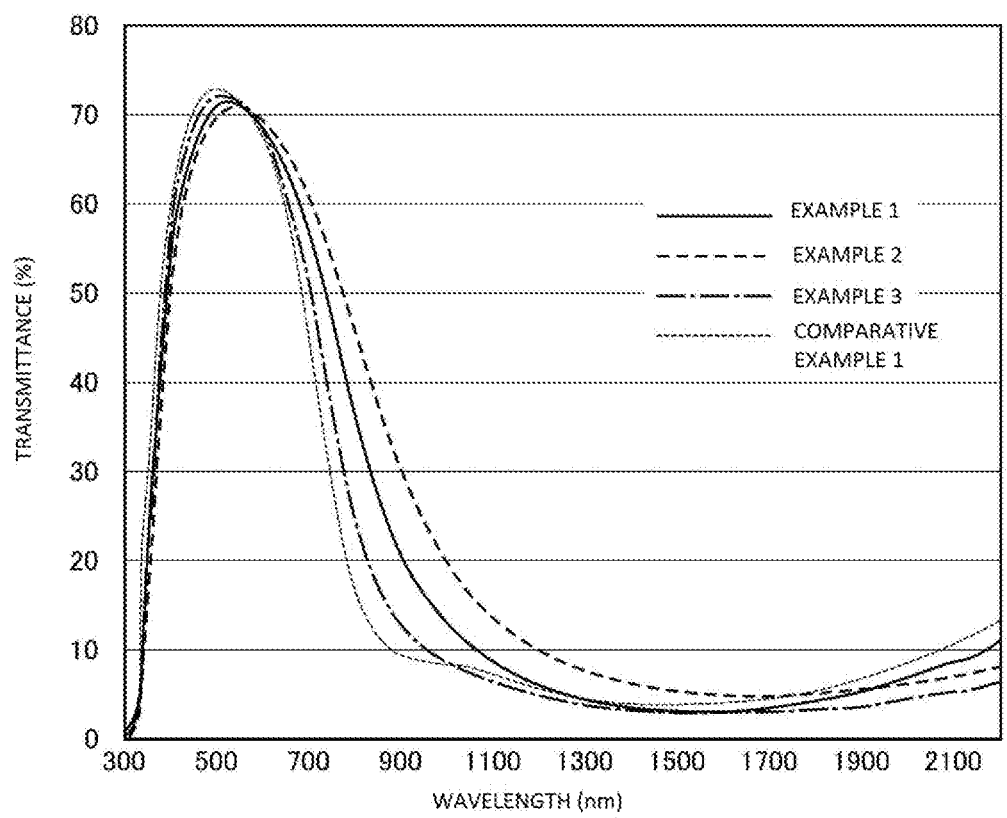
FIG. 2 is transmittance profiles by wavelength of heat ray shielding films according to the present invention.

The optical characteristics of the heat ray shielding film were measured and determined from the transmittance profile to be an average value of transmittance for wavelengths from 800 nm to 900 nm of 27.9%, an average value of transmittance for wavelengths from 1200 nm to 1500 nm of 4.2%, and a transmittance at a wavelength of 2100 nm of 5.4%, with a haze of 0.9%. These results are listed in Table 3, and the transmittance profile by wavelength is illustrated in FIG. 2.

The dispersant a was further added to the dispersion liquid A, and prepared so as to give a ratio by weight between the dispersant a and the composite tungsten oxide fine particles [dispersant a/composite tungsten oxide fine particles]=3. Then a spray dryer was employed to remove the methyl isobutyl ketone from the composite tungsten oxide fine particle dispersion liquid A, thereby obtaining the composite tungsten oxide fine particle dispersed powder (referred to below as dispersed powder A).

The dispersed powder A was added to a polycarbonate resin, which is a thermoplastic resin, at a predetermined amount so that the visible light transmittance of the produced heat ray shielding sheet (2.0 mm thickness) is 70%, thereby preparing a composition for producing the heat ray shielding sheet.

The composition for producing the heat ray shielding sheet was kneaded at 280° C. using a twin screw extruder, extruded from a T die, and formed into a sheet material having a thickness of 2.0 mm by a calendar roll method, thereby obtaining a heat ray shielding sheet according to Example 1.

The optical properties of the obtained heat ray shielding sheet according to Example 1 were measured and, for a visible light transmittance of 70%, determined to be an average value of transmittance for wavelengths from 800 nm to 900 nm of 26.8%, an average value of transmittance for wavelengths from 1200 nm to 1500 nm of 3.7%, and a transmittance at a wavelength of 2100 nm of 2.6%, with a haze of 0.5%. These results are listed in Table 5.

[Example 2] MIBK Dispersion Liquid of $Cs_{0.20}WO_3$

Powders of tungstic acid ($H_2WO_4$) and caesium hydroxide (CsOH) were weighed out at a ratio equivalent to Cs/W (mol ratio)=0.20/1.00, and thoroughly mixed in an agate mortar to obtain a mixed powder. The mixed powder was heated under a 0.8% $H_2$ gas supply using $N_2$ gas as a carrier, and after performing reduction treatment at a temperature of 550° C. for 20 minutes, the mixed powder was fired for 1 hour under an $N_2$ gas atmosphere at 800° C., thereby obtaining a caesium tungsten bronze powder having a hexagonal crystal structure with a lattice constant on the a-axis of 7.4143 Å, a lattice constant on the c-axis of 7.5766 Å, and having a powder color expressed in L*a*b* color space of L* 47.55, a* −5.17, and b* −6.07 (hereinafter abbreviated to "powder B"). The measurement results are listed in Table 1.

20 mass % of the powder B, 10 mass % of an acrylic based polymeric dispersant having a group containing an amine as a functional group (acrylic based dispersant having an amine number of 48 mg KOH/g, and decomposition temperature of 250° C. (hereinafter abbreviated to "dispersant b"), and 70 mass % of methyl isobutyl ketone were weighed out. These were loaded into a paint shaker containing 0.3 mm φ $ZrO_2$ beads, and pulverized/dispersed for 10 hours to obtain a heat ray shielding fine particle dispersion liquid (hereinafter abbreviated to "dispersion liquid B"). The average dispersed particle size of the heat ray shielding fine particles in the dispersion liquid B was measured and found to be 23 nm.

The spectral transmittance was measured similarly to in Example 1, except in that the dispersion liquid B was used. The transmittance profile measured when the dilution ratio had been adjusted to give a visible light transmittance of 85% gave an average value of transmittance for wavelengths from 800 nm to 900 nm of 55.7%, an average value of transmittance for wavelengths from 1200 nm to 1500 nm of 18.3%, and a transmittance at a wavelength of 2100 nm of 18.5%. This confirmed that clearly the visible light transmission band was widened and the heat ray shielding performance improved at the wavelength of 2100 nm, in comparison to caesium tungsten bronze produced by a conventional method illustrated in Comparative Example 1 below. The measurement results for powder color of the powder B are listed in Table 1, and the measurement results for transmittance are listed in Table 2 and FIG. 1.

A heat ray shielding film provided with a coating layer containing heat ray shielding fine particles was produced similarly to in Example 1, except for using the dispersion liquid B as the heat ray shielding coating solution (referred to below as coating solution B).

In the heat ray shielding film preparation described above, the heat ray shielding fine particle concentration in the coating solution and the layer thickness of the coating layer were adjusted such that the visible light transmittance was 70%.

The optical characteristics of the heat ray shielding film were measured and determined from the transmittance profile to be an average value of transmittance for wavelengths from 800 nm to 900 nm of 37.7%, an average value of transmittance for wavelengths from 1200 nm to 1500 nm of 7.2%, and a transmittance at a wavelength of 2100 nm of 7.0%, with a haze of 1.0%. These results are listed in Table 3, and the transmittance profile by wavelength is illustrated in FIG. 2.

The dispersant b was further added to the dispersion liquid B, and except in having a ratio by weight between the dispersant b and the composite tungsten oxide fine particles [dispersant b/composite tungsten oxide fine particles]=3, otherwise similarly prepared to as in Example 1 so as to thereby obtain a composite tungsten oxide fine particle dispersed powder (referred to below as dispersed powder B).

A heat ray shielding sheet according to Example 2 was obtained similarly to in Example 1, except in that the dispersed powder B was used.

The optical properties of the obtained heat ray shielding sheet according to Example 2 were measured and, for a visible light transmittance of 70%, determined to be an average value of transmittance for wavelengths from 800 nm to 900 nm of 36.6%, an average value of transmittance for wavelengths from 1200 nm to 1500 nm of 6.4%, and a transmittance at a wavelength of 2100 nm of 3.4%, with a haze of 0.6%. These results are listed in Table 5.

[Example 3] MIBK Dispersion Liquid of $Cs_{0.33}WO_3$

Powders of tungstic acid ($H_2WO_4$) and caesium hydroxide (CsOH) were weighed out at a ratio equivalent to Cs/W (mol ratio)=0.33/1.00, and thoroughly mixed in an agate mortar to obtain a mixed powder. The mixed powder was heated under a 0.3% $H_2$ gas supply using $N_2$ gas as a carrier, and after performing reduction treatment at a temperature of 500° C. for 6 hours, the mixed powder was fired for 1 hour under an $N_2$ gas atmosphere at 800° C., thereby obtaining a caesium tungsten bronze powder having a hexagonal crystal structure with a lattice constant on the a-axis of 7.4097 Å, a lattice constant on the c-axis of 7.6033 Å, and having a powder color expressed in L*a*b* color space of L* 39.58, a* −1.63, and b* −7.33 (hereinafter abbreviated to "powder C"). The measurement results are listed in Table 1.

20 mass % of the powder C, 10 mass % of an acrylic based polymeric dispersant having a group containing an amine as a functional group (acrylic-based dispersant having an amine number of 48 mg KOH/g, and decomposition temperature of 250° C. (hereinafter abbreviated to "dispersant c"), and 70 mass % of methyl isobutyl ketone were weighed out. These were loaded into a paint shaker containing 0.3 mm φ $ZrO_2$ beads, and pulverized/dispersed for 10 hours to obtain a heat ray shielding fine particle dispersion liquid (hereinafter abbreviated to "dispersion liquid C"). The average dispersed particle size of the heat ray shielding fine particles in the dispersion liquid C was measured and found to be 25 nm.

The spectral transmittance was measured similarly to in Example 1, except in that the dispersion liquid C was used. The transmittance profile measured when the dilution ratio had been adjusted to give a visible light transmittance of 85% gave an average value of transmittance for wavelengths from 800 nm to 900 nm of 33.4%, an average value of transmittance for wavelengths from 1200 nm to 1500 nm of 11.6%, and a transmittance at a wavelength of 2100 nm of 21.4%. This confirmed that clearly the visible light transmission band was widened and the heat ray shielding performance improved at the wavelength of 2100 nm, in comparison to caesium tungsten bronze produced by a conventional method illustrated in Comparative Example 1 below. The measurement results for powder color of the powder C are listed in Table 1, and the measurement results for transmittance are listed in Table 2 and FIG. 1.

A heat ray shielding film provided with a coating layer containing heat ray shielding fine particles was produced similarly to in Example 1, except for using the dispersion liquid C as the heat ray shielding coating solution (referred to below as coating solution C).

In the heat ray shielding film preparation described above, the heat ray shielding fine particle concentration in the coating solution and the layer thickness of the coating layer were adjusted such that the visible light transmittance was 70%.

The optical characteristics of the heat ray shielding film were measured and determined from the transmittance profile to be an average value of transmittance for wavelengths from 800 nm to 900 nm of 17.6%, an average value of transmittance for wavelengths from 1200 nm to 1500 nm of 3.6%, and a transmittance at a wavelength of 2100 nm of 8.7%, with a haze of 1.0%. These results are listed in Table 3, and the transmittance profile by wavelength is illustrated in FIG. 2.

The dispersant c was further added to the dispersion liquid C, and except in having a ratio by weight between the dispersant c and the composite tungsten oxide fine particles [dispersant c/composite tungsten oxide fine particles]=3, otherwise similarly prepared to as in Example 1 so as to thereby obtain a composite tungsten oxide fine particle dispersed powder (referred to below as dispersed powder C).

A heat ray shielding sheet according to Example 3 was obtained similarly to in Example 1, except for using the dispersed powder C.

The optical properties of the obtained heat ray shielding sheet according to Example 3 were measured and, for a visible light transmittance of 70%, determined to be an average value of transmittance for wavelengths from 800 nm to 900 nm of 16.7%, an average value of transmittance for wavelengths from 1200 nm to 1500 nm of 3.1%, and a transmittance at a wavelength of 2100 nm of 4.2%, with a haze of 0.6%. These results are listed in Table 5.

[Example 4] MIBK Dispersion Liquid of $Cs_{0.33}WO_3$ 1 part by weight of a benzotriazole based ultraviolet absorber containing a benzotriazole compound (TINUVIN 384-2, produced by BASF Corporation), 1 part by weight of an aminoether based HALS containing a reaction product of bis(2,2,6,6-tetramethyl-1-octyloxypiperidin-4-yl) decanedioate with 1,1-dimethylethylhydroperoxide octane (TINUVIN 123, produced by BASF Corporation), and, as an antioxidant, 1 part by weight of a hindered phenol based antioxidant including isooctyl-3-(3,5-di-t-butyl-4-hydroxyphenyl)propionate (Trade Name: IRAGANOX 1135 produced by BASF Corporation) were weighed out for 100 parts by weight of the dispersed powder C. These were loaded into a paint shaker containing 0.3 mm φ $ZrO_2$ beads, and pulverized/dispersed for 10 hours to obtain a heat ray shielding fine particle dispersion liquid (hereinafter abbreviated to "dispersion liquid D"). The average dispersed particle size of the heat ray shielding fine particles in the dispersion liquid D was measured and found to be 25 nm.

The spectral transmittance was measured similarly to in Example 1, except in that the dispersion liquid D was used. The transmittance profile measured when the dilution ratio had been adjusted to give a visible light transmittance of 85% gave an average value of transmittance for wavelengths from 800 nm to 900 nm of 34.2%, an average value of transmittance for wavelengths from 1200 nm to 1500 nm of 10.4%, and a transmittance at a wavelength of 2100 nm of 21.2%. This confirmed that clearly the visible light transmission band was widened and the heat ray shielding performance improved at the wavelength of 2100 nm, in comparison to caesium tungsten bronze produced by a conventional method illustrated in Comparative Example 1 below. The measurement results for transmittance are listed in Table 2 and FIG. 1.

A heat ray shielding film provided with a coating layer containing heat ray shielding fine particles was produced similarly to in Example 1, except for using the dispersion liquid D as the heat ray shielding coating solution (referred to below as coating solution D).

In the heat ray shielding film preparation described above, the heat ray shielding fine particle concentration in the coating solution and the layer thickness of the coating layer were adjusted such that the visible light transmittance was 70%.

The optical characteristics of the heat ray shielding film were measured and determined from the transmittance profile to be an average value of transmittance for wavelengths from 800 nm to 900 nm of 17.6%, an average value of transmittance for wavelengths from 1200 nm to 1500 nm of 3.6%, and a transmittance at a wavelength of 2100 nm of 8.7%, with a haze of 1.0%. These results are listed in Table 3, and the transmittance profile by wavelength is shown in FIG. 2.

The dispersant c was further added to the dispersion liquid D, and except in having a ratio by weight between the dispersant c and the composite tungsten oxide fine particles [dispersant c/composite tungsten oxide fine particles]=3, otherwise similarly prepared to as in Example 1 so as to thereby obtain a composite tungsten oxide fine particle dispersed powder (referred to below as dispersed powder D).

A heat ray shielding sheet according to Example 4 was obtained similarly to in Example 1, except for using the dispersed powder D.

The optical properties of the obtained heat ray shielding sheet according to Example 4 were measured and, for a visible light transmittance of 70%, determined to be an average value of transmittance for wavelengths from 800 nm to 900 nm of 17.3%, an average value of transmittance for wavelengths from 1200 nm to 1500 nm of 3.1%, and a transmittance at a wavelength of 2100 nm of 4.2%, with a haze of 0.6%. These results are listed in Table 5.

[Comparative Example 1] MIBK Dispersion Liquid of $Cs_{0.33}WO_3$

Except for heating under a 5% $H_2$ gas supply using $N_2$ gas as a carrier, and after performing reduction treatment at a temperature of 550° C. for 1 hour, firing for 1 hour under an $N_2$ gas atmosphere at 800° C., similarly to in Example 3, a caesium tungsten bronze powder according to Comparative Example 1 was obtained having a hexagonal crystal structure with a lattice constant on the a-axis of 7.4080 Å, a lattice constant on the c-axis of 7.6111 Å, and having a powder color expressed in L*a*b* color space of L* 36.11, a* 0.52, and b* −5.54 (hereinafter abbreviated to "powder E"). The measurement results are listed in Table 1.

A dispersion liquid was prepared using these powders and a dispersant and a solvent in paint shaker, and the average dispersed particle size was found to be 23 nm.

The spectral transmittance was measured by measuring when the dilution ratio had been adjusted to give a visible light transmittance of 85% and, the transmittance profile was found to have an average value of transmittance for wavelengths from 800 nm to 900 nm of 26.0%, an average value of transmittance for wavelengths from 1200 nm to 1500 nm of 13.3%, and a transmittance at a wavelength of 2100 nm of 24.4%.

This confirmed that the average value of transmittance for wavelengths from 800 nm to 900 nm was lower than in the Examples 1 to 3, and that there was a high transmittance for the transmittance at the wavelength of 2100 nm. The measurement results of powder color of the power E are listed in Table 1, and the measurement results of transmittance are listed in Table 2 and FIG. 1.

A heat ray shielding film provided with a coating layer containing heat ray shielding fine particles was produced similarly to in Example 1, except for using the dispersion liquid E as the heat ray shielding coating solution (referred to below as coating solution E).

In the heat ray shielding film preparation described above, the heat ray shielding fine particle concentration in the coating solution and the layer thickness of the coating layer were adjusted such that the visible light transmittance was 70%.

The optical characteristics of the heat ray shielding film were measured and determined from the transmittance profile to be an average value of transmittance for wavelengths from 800 nm to 900 nm of 12.1%, an average value of transmittance for wavelengths from 1200 nm to 1500 nm of 4.5%, and a transmittance at a wavelength of 2100 nm of 10.6%, with a haze of 0.9%. These results are listed in Table 3, and the transmittance profile by wavelength is illustrated in FIG. 2.

The dispersant c was further added to the dispersion liquid E, and except in having a ratio by weight between the dispersant c and the composite tungsten oxide fine particles [dispersant c/composite tungsten oxide fine particles]=3, otherwise similarly prepared to as in Example 1 so as to thereby obtain a composite tungsten oxide fine particle dispersed powder (referred to below as dispersed powder E).

A heat ray shielding sheet according to Comparative Example 1 was obtained similarly to in Example 1, except for using the dispersed powder E.

The optical properties of the obtained heat ray shielding sheet according to Comparative Example 1 were measured and, for a visible light transmittance of 70%, determined to be an average value of transmittance for wavelengths from 800 nm to 900 nm of 11.3%, an average value of transmittance for wavelengths from 1200 nm to 1500 nm of 3.9%, and a transmittance at a wavelength of 2100 nm of 5.1%, with a haze of 0.6%. These results are listed in Table 5.

[Example 5] Heat Ray Shielding Glass Using $Cs_{0.30}WO_3$

The coating solution A was applied with a bar coater to an inorganic clear glass of 10 cm×10 cm×2 mm in size, so as to form a coating layer. After drying the coating layer for 60 seconds at 80° C. and evaporating the solvent, the coating layer was then cured with a high pressure mercury lamp, to thereby prepare a heat ray shielding glass formed with a coating layer containing the heat ray shielding fine particles.

In the heat ray shielding glass preparation described above, the heat ray shielding fine particle concentration in the coating solution and the layer thickness of the coating layer were adjusted such that the visible light transmittance was 70%.

The optical properties of this heat ray shielding glass were measured and determined from the transmittance profile to be an average value of transmittance for wavelengths from 800 nm to 900 nm of 24.3%, an average value of transmittance for wavelengths from 1200 nm to 1500 nm of 3.2%, and a transmittance at a wavelength of 2100 nm of 4.5%, with a haze of 0.5%. These results are listed in Table 4.

[Example 6] Heat Ray Shielding Glass Using $Cs_{0.20}WO_3$

A heat ray shielding glass was prepared similarly to in Example 5, except in that the coating solution B was employed.

In the heat ray shielding glass preparation described above, the heat ray shielding fine particle concentration in the coating solution and the layer thickness of the coating layer were adjusted such that the visible light transmittance was 70%.

The optical properties of this heat ray shielding glass were measured and determined from the transmittance profile to be an average value of transmittance for wavelengths from 800 nm to 900 nm of 33.4%, an average value of transmittance for wavelengths from 1200 nm to 1500 nm of 5.7%, and a transmittance at a wavelength of 2100 nm of 6.0%, with a haze of 0.4%. These results are listed in Table 4.

[Example 7] Heat Ray Shielding Glass Using $Cs_{0.33}WO_3$

A heat ray shielding glass was prepared similarly to in Example 5, except in that the coating solution C was employed.

In the heat ray shielding glass preparation described above, the heat ray shielding fine particle concentration in the coating solution and the layer thickness of the coating layer were adjusted such that the visible light transmittance was 70%.

The optical properties of this heat ray shielding glass were measured and determined from the transmittance profile to be an average value of transmittance for wavelengths from 800 nm to 900 nm of 14.9%, an average value of transmittance for wavelengths from 1200 nm to 1500 nm of 2.7%, and a transmittance at a wavelength of 2100 nm of 7.5%, with a haze of 0.5%. These results are listed in Table 4.

[Example 8] Heat Ray Shielding Glass Using $Cs_{0.33}WO_3$

A heat ray shielding glass was prepared similarly to in Example 5, except in that the coating solution D was employed.

In the heat ray shielding glass preparation described above, the heat ray shielding fine particle concentration in the coating solution and the layer thickness of the coating layer were adjusted such that the visible light transmittance was 70%.

The optical properties of this heat ray shielding glass were measured and determined from the transmittance profile to be an average value of transmittance for wavelengths from 800 nm to 900 nm of 14.9%, an average value of transmittance for wavelengths from 1200 nm to 1500 nm of 2.7%, and a transmittance at a wavelength of 2100 nm of 7.5%, with a haze of 0.5%. These results are listed in Table 4.

[Comparative Example 2] Heat Ray Shielding Glass Using $Cs_{0.33}WO_3$

A heat ray shielding glass was prepared similarly to in Example 5, except in that the coating solution E was employed.

In the heat ray shielding glass preparation described above, the heat ray shielding fine particle concentration in the coating solution and the layer thickness of the coating layer were adjusted such that the visible light transmittance was 70%.

The optical properties of this heat ray shielding glass were measured and determined from the transmittance profile to be an average value of transmittance for wavelengths from 800 nm to 900 nm of 10.0%, an average value of transmittance for wavelengths from 1200 nm to 1500 nm of 3.4%, and a transmittance at a wavelength of 2100 nm of 9.2%, with a haze of 0.5%. These results are listed in Table 4.

[Example 9] Heat Ray Shielding Master Batch Using $Cs_{0.33}WO_3$

The dispersed powder C prepared in Example 3 and polycarbonate resin pellets were mixed so give a concentration of composite tungsten oxide fine particles of 2.0 mass %, and a blender was employed for mixing so as to give a uniform mixture. The mixture was melted and kneaded using a twin screw extruder at 290° C., extruded strands were cut into pellet shapes, to thereby obtain a master batch according to Example 9 for use in a heat ray shielding transparent resin molded body (referred to below as master batch C).

A composition for producing the heat ray shielding sheet according to Example 9 was prepared by adding a predetermined amount of master batch C at a predetermined amount to polycarbonate resin pellets. Note that the predetermined amount is an amount such that a heat ray shielding sheet (thickness 1.0 mm) produced thereby has a visible light transmittance of 70%.

The composition for producing the heat ray shielding sheet according to Example 9 as kneaded at 280° C. using a twin screw extruder, extruded from a T die, and formed into a sheet material having a thickness of 1.0 mm by a calendar roll method, thereby obtaining the heat ray shielding sheet according to Example 9.

The optical properties of the obtained heat ray shielding sheet according to Example 9 were measured and, for a visible light transmittance of 70%, determined to be an average value of transmittance for wavelengths from 800 nm to 900 nm of 27.0%, an average value of transmittance for wavelengths from 1200 nm to 1500 nm of 4.3%, and a transmittance at a wavelength of 2100 nm of 3.6%, with a haze of 0.6%. These results are listed in Table 5.

These results confirmed that, similarly to the dispersed powder of Example 3, a master batch of heat ray shielding fine particle dispersion body capable of favorable employment to manufacture a heat ray shielding sheet can be prepared.

[Comparative Example 3] Heat Ray Shielding Master Batch Employing $Cs_{0.33}WO_3$ A master batch according to the Comparative Example 3 for use in a heat ray shielding transparent resin molded body is prepared similarly to in Example 5, except for employing the dispersed powder E prepared in Comparative Example 1, was obtained (referred to below as master batch E).

A heat ray shielding sheet according to Comparative Example 3 as obtained similarly to Example 5, except for adding a predetermined amount of master batch E at a predetermined amount to polycarbonate resin pellets The optical properties of the obtained heat ray shielding sheet according to Comparative Example 3 were measured and determined, for a visible light transmittance of 70%, to be an average value of transmittance for wavelengths from 800 nm to 900 nm of 11.7%, an average value of transmittance for wavelengths from 1200 nm to 1500 nm of 3.9%, and a transmittance at a wavelength of 2100 nm of 5.3%, with a haze of 0.5%. These results are listed in Table 5.

[Example 10] Heat Ray Shielding Film and Heat Ray Shielding Laminated Transparent Substrate Employing $Cs_{0.30}WO_3$ A triethylene glycol-di-2-ethylbutyrate plasticizer was added to a polyvinyl butyral resin and a mixture prepared such that the ratio by weight between the polyvinyl butyral resin and the plasticizer [polyvinyl butyral resin/plasticizer] =100/40. The dispersed powder A prepared in the Example 1 was added at a predetermined amount to the mixture, so as to prepare a composition for use in producing a heat ray shielding film. Note that the predetermined amount is an amount such that the visible light transmittance of the produced heat ray shielding laminated transparent substrate was 70%.

This composition for use in producing was kneaded and mixed for 30 minutes at 70° C. using a three-roll mixer to obtain a mixture. The temperature of the mixture was then raised to 180° C. in a mold extruder, and a heat ray shielding film according to Example 10 produced by forming the mixture into a film having a thickness of about 1 mm and winding into a roll.

The heat ray shielding film according to Example 10 was then cut into 10 cm×10 cm pieces, and sandwiched between two sheets of inorganic clear glass 3 mm thick of the same dimensions, to thereby form a laminated body. The laminated body was then placed in a rubber vacuum bag, and after removing the air from inside the bag and holding at 90° C. for 30 minutes, the laminated body was then returned to a normal temperature, and removed from the bag. The laminated body was then placed in an autoclave apparatus, and pressurized and heated to a pressure of 12 kg/cm² and a temperature of 140° C. for 20 minutes, to thereby prepare a heat ray shielding laminated glass sheet according to Example 10.

Figure 3:
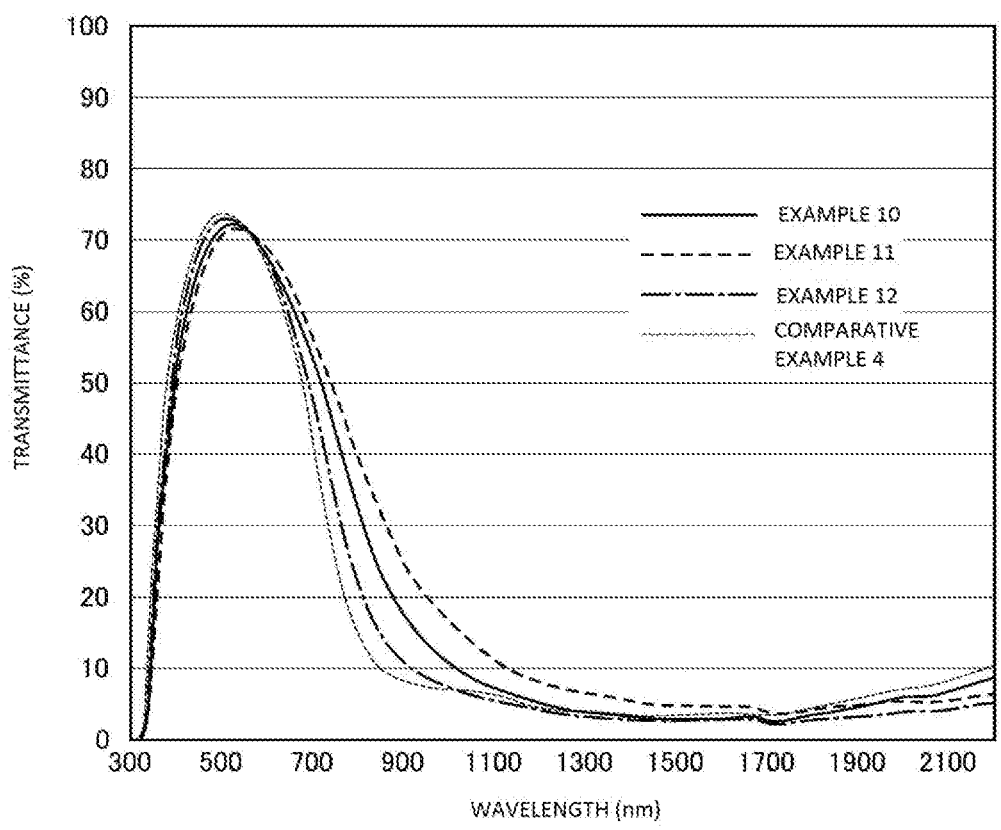
FIG. 3 is transmittance profiles by wavelength of heat ray shielding laminated transparent substrates according to the present invention.

The optical properties of the heat ray shielding laminated transparent substrate according to Example 10 were measured and determined, for a visible light transmittance of 70%, to be an average value of transmittance for wavelengths from 800 nm to 900 nm of 23.4%, an average value of transmittance for wavelengths from 1200 nm to 1500 nm of 3.6%, and a transmittance at a wavelength of 2100 nm of 4.3%, with a haze of 0.8%. These results are listed in Table 6, and the transmittance profile by wavelength is illustrated in FIG. 3.

[Example 11] Heat Ray Shielding Film and Heat Ray Shielding Laminated Transparent Substrate Employing $Cs_{0.20}WO_3$ A heat ray shielding film according to an Example 11 was produced similarly to Example 10 except in that a predetermined amount of the dispersed powder B produced in Example 2 was added to the mixture of polyvinyl butyral resin and the plasticizer.

A heat ray shielding laminated glass sheet according to example 11 was produced similarly to in Example 10 except in that the heat ray shielding film example 11 was employed.

The optical properties of the heat ray shielding laminated transparent substrate according to Example 11 were measured and determined, for a visible light transmittance of 70%, to be an average value of transmittance for wavelengths from 800 nm to 900 nm of 32.0%, an average value of transmittance for wavelengths from 1200 nm to 1500 nm of 6.1%, and a transmittance at a wavelength of 2100 nm of 5.6%, with a haze of 0.6%. These results are listed in Table 6, and the transmittance profile by wavelength is illustrated in FIG. 3.

[Example 12] Heat Ray Shielding Film and Heat Ray Shielding Laminated Transparent Substrate Employing $Cs_{0.33}WO_3$ A heat ray shielding film according to an Example 12 was produced similarly to the Example 10 except in that a predetermined amount of the dispersed powder C produced in Example 3 was added to the mixture of polyvinyl butyral resin and the plasticizer.

A heat ray shielding laminated glass sheet according to example 12 was produced similarly to in Example 10 except in that the heat ray shielding film according to example 12 was employed.

The optical properties of the heat ray shielding laminated transparent substrate according to Example 12 were measured and determined, for a visible light transmittance of 70%, to be an average value of transmittance for wavelengths from 800 nm to 900 nm of 15.3%, an average value of transmittance for wavelengths from 1200 nm to 1500 nm of 3.1%, and a transmittance at a wavelength of 2100 nm of 6.9%, with a haze of 1.0%. These results are listed in Table 6, and the transmittance profile by wavelength is illustrated in FIG. 3.

[Comparative Example 4] Heat Ray Shielding Film and Heat Ray Shielding Laminated Transparent Substrate Employing $Cs_{0.33}WO_3$ A heat ray shielding film according to a Comparative Example 4 was produced similarly to the Example 10 except in that a predetermined amount of the dispersed powder D produced in Comparative Example 1 was added to the mixture of polyvinyl butyral resin and the plasticizer.

A heat ray shielding laminated glass sheet according to Comparative Example 4 was produced similarly to in Example 10 except in that the heat ray shielding film according to Comparative Example 4 was employed.

The optical properties of the heat ray shielding laminated transparent substrate according to Comparative Example 4 were measured and determined, for a visible light transmittance of 70%, to be an average value of transmittance for wavelengths from 800 nm to 900 nm of 10.6%, an average value of transmittance for wavelengths from 1200 nm to 1500 nm of 3.8%, and a transmittance at a wavelength of 2100 nm of 8.3%, with a haze of 0.8%. These results are listed in Table 6, and the transmittance profile by wavelength is illustrated in FIG. 3.

Evaluation of Examples 1 to 12 and Comparative Examples 1 to 4

With the heat ray shielding fine particles according to Examples 1 to 4, compared to Comparative Example 1 of conventional composite tungsten oxide fine particles, when the visible light transmittance was 85%, the average value of transmittance is high for near-infrared light in the wavelength region from 800 nm to 900 nm, and the transmittance is low for wavelengths from 1200 nm to 1500 nm and at a wavelength of 2100 nm. From these results it has been determined that the composite tungsten oxide fine particles, while securing the exhibition of high heat shielding characteristics, obtain a high transmittance of near-infrared light in the wavelength region from 800 nm to 900 nm and reduce a scorching sensation on the skin.

From the above results it is apparent that, for all of the heat ray shielding films and heat ray shielding sheets according to Examples 1 to 4, the heat ray shielding glass according to Examples 5 to 8, the heat ray shielding sheet according to Example 9, and the heat ray shielding laminated glass sheet according to Examples 10 to 12, when the visible light transmittance is 85%, the average value of transmittance is high for near-infrared light in the wavelength region from 800 nm to 900 nm, and the transmittance for wavelengths from 1200 nm to 1800 nm and at a wavelength of 2100 nm is low, compared to the heat ray shielding film and heat ray shielding sheets using the conventional composite tungsten oxide fine particles of Comparative Example 1, the heat ray shielding glass using the conventional composite tungsten oxide fine particles according to Comparative Example 2, the heat ray shielding sheet using conventional composite tungsten oxide fine particles according to Comparative Example 3, and the heat ray shielding laminated glass sheet using conventional composite tungsten oxide fine particles according to Comparative Example 4. From these results it has been determined that the composite tungsten oxide fine particles of the present invention, while securing the exhibition of high heat shielding characteristics, obtain a high transmittance of near-infrared light in the wavelength region from 800 nm to 900 nm and reduce a scorching sensation on the skin.

TABLE 1

| | Powder | Cs/W (Mole Ratio) | Lattice Constant a (Å) | Lattice Constant c (Å) | Powder Color L* | Powder Color a* | Powder Color b* |
|---|---|---|---|---|---|---|---|
| Example 1 | A | 0.30 | 7.4131 | 7.5885 | 41.86 | −2.90 | −6.76 |
| Example 2 | B | 0.20 | 7.4143 | 7.5766 | 47.55 | −5.17 | −6.07 |
| Example 3 | C | 0.33 | 7.4097 | 7.6033 | 39.58 | −1.63 | −7.33 |
| Comparative Example 1 | E | 0.33 | 7.4080 | 7.6111 | 36.11 | 0.52 | −5.54 |

TABLE 2

| | Powder | Dispersion Liquid | Visible Light (%) | Transmittance 800 nm to 900 nm (%) | Transmittance 1200 nm to 1500 nm (%) | 2100 nm (%) | Average Dispersed Particle Size (nm) |
|---|---|---|---|---|---|---|---|
| Example 1 | A | A | 85.0 | 45.5 | 12.8 | 15.5 | 25 |
| Example 2 | B | B | | 55.7 | 18.3 | 18.5 | 23 |
| Example 3 | C | C | | 33.4 | 11.6 | 21.4 | 25 |
| Example 4 | C | D | | 34.2 | 10.4 | 21.2 | 25 |
| Comparative Example 1 | E | E | | 26.0 | 13.3 | 24.4 | 23 |

TABLE 3

| | Powder | Dispersion Liquid | Transmittance (Film) Visible Light (%) | Transmittance (Film) 800 nm to 900 nm (%) | Transmittance (Film) 1200 nm to 1500 nm (%) | 2100 nm (%) | Haze (%) |
|---|---|---|---|---|---|---|---|
| Example 1 | A | A | 70.0 | 27.9 | 4.2 | 5.4 | 0.9 |
| Example 2 | B | B | | 37.7 | 7.2 | 7.0 | 1.0 |
| Example 3 | C | C | | 17.6 | 3.6 | 8.7 | 1.0 |
| Example 4 | C | D | | 17.6 | 3.6 | 8.7 | 1.0 |
| Comparative Example 1 | E | E | | 12.1 | 4.5 | 10.6 | 0.9 |

TABLE 4

| | Powder | Dispersion Liquid | Transmittance (Glass) Visible Light (%) | Transmittance (Glass) 800 nm to 900 nm (%) | Transmittance (Glass) 1200 nm to 1500 nm (%) | 2100 nm (%) | Haze (%) |
|---|---|---|---|---|---|---|---|
| Example 5 | A | A | 70.0 | 24.3 | 3.2 | 4.5 | 0.5 |
| Example 6 | B | B | | 33.4 | 5.7 | 6.0 | 0.4 |
| Example 7 | C | C | | 14.9 | 2.7 | 7.5 | 0.5 |
| Example 8 | C | D | | 14.9 | 2.7 | 7.5 | 0.5 |
| Comparative Example 2 | E | E | | 10.0 | 3.4 | 9.2 | 0.5 |

TABLE 5

| | | | Transmittance (Dispersion Body) | | | |
|---|---|---|---|---|---|---|
| | Powder | Dispersion Liquid | Visible Light (%) | 800 nm to 900 nm (%) | 1200 nm to 1500 nm (%) | 2100 nm (%) | Haze (%) |
| Example 1 | A | A | 70.0 | 26.8 | 3.7 | 2.6 | 0.5 |
| Example 2 | B | B | | 36.6 | 6.4 | 3.4 | 0.6 |
| Example 3 | C | C | | 16.7 | 3.1 | 4.2 | 0.6 |
| Example 4 | C | D | | 17.3 | 3.1 | 4.2 | 0.6 |
| Comparative Example 1 | E | E | | 11.3 | 3.9 | 5.1 | 0.6 |
| Example 9 | C | D (MB) | | 27.0 | 4.3 | 3.6 | 0.6 |
| Comparative Example 3 | E | E (MB) | | 11.7 | 3.9 | 5.3 | 0.5 |

Note that MB stands for master batch

TABLE 6

| | | Transmittance (Laminated Transparent Substrate) | | | |
|---|---|---|---|---|---|
| | Dispersion Powder | Visible Light (%) | 800 nm to 900 nm (%) | 1200 nm to 1500 nm (%) | 2100 nm (%) | Haze (%) |
| Example 10 | A | 70.0 | 23.4 | 3.6 | 4.3 | 0.8 |
| Example 11 | B | | 32.0 | 6.1 | 5.6 | 0.6 |
| Example 12 | C | | 15.3 | 3.1 | 6.9 | 1.0 |
| Comparative Example 4 | E | | 10.6 | 3.8 | 8.3 | 0.8 |

The invention claimed is:

1. A heat ray shielding fine particle dispersion body, comprising:
   composite tungsten oxide fine particles having a heat ray shielding function, and having:
   a dispersed particle size of 23 to 25 nm,
   a hexagonal system crystal structure with a lattice constant on the c-axis being from 7.5766 Å to 7.6033 Å,
   a composition represented by general formula $M_xWO_y$, in which:
   M is one or more elements selected from Cs, Rb, K, Tl, and Ba,
   $0.1 \leq x \leq 0.5$, and
   $2.2 \leq y \leq 3.0$, and
   a powder color in L*a*b* color space, where:
   L* is from 30 to 55,
   a* is from −6.0 to −0.5, and
   b* is from −10 to 0,
   wherein when a visible light transmittance obtained by computing only light absorption by the composite tungsten oxide fine particles is 85%:
   an average value of transmittance in the wavelength region from 800 nm to 900 nm is from 30% to 60%,
   an average value of transmittance in the wavelength region from 1200 nm to 1500 nm is 20% or lower, and
   a transmittance at a wavelength of 2100 nm is 22% or lower.

2. The heat ray shielding fine particle dispersion body of claim 1, further comprising a thermoplastic resin in which the composite tungsten oxide fine particles are dispersed, wherein the thermoplastic resin is:
   any one resin selected from a resin group consisting of a polyethylene terephthalate resin, a polycarbonate resin, an acrylic resin, a styrene resin, a polyamide resin, a polyethylene resin, a vinyl chloride resin, an olefin resin, an epoxy resin, a polyimide resin, a fluororesin, an ethylene/vinyl acetate copolymer, and a polyvinyl acetal resin; or
   a mixture of two or more resins selected from the resin group; or
   a copolymer of two or more resins selected from the resin group.

3. The heat ray shielding fine particle dispersion body of claim 1, wherein a content of the composite tungsten oxide fine particles contained in the heat ray shielding fine particle dispersion body is from 0.5 mass % to 80.0 mass %.

4. The heat ray shielding fine particle dispersion body of claim 1, wherein the heat ray shielding fine particle dispersion body is in a sheet shape, a board shape, or a film shape.

5. The heat ray shielding fine particle dispersion body of claim 1, wherein a content of the composite tungsten oxide fine particles contained in the heat ray shielding fine particle dispersion body per unit projected area is from 0.1 g/m² to 5.0 g/m².

6. The heat ray shielding fine particle dispersion body of claim 1, wherein when the visible light transmittance obtained by computing only the light absorption by the composite tungsten oxide fine particles is 70%:
   the average value of transmittance in the wavelength region from 800 nm to 900 nm is from 13% to 40%, and
   the average value of transmittance in the wavelength region from 1200 nm to 1500 nm is 8% or lower, and
   the transmittance at a wavelength of 2100 nm is 5% or lower.

7. The heat ray shielding fine particle dispersion body of claim 1, further comprising one or more kinds selected from an ultraviolet absorber, a hindered amine-based light stabilizer (HALS), and an antioxidant.

8. A heat ray shielding laminated transparent substrate comprising the heat ray shielding fine particle dispersion body of claim 1 interposed between a plurality of sheets of transparent substrate.

9. The heat ray shielding laminated transparent substrate of claim 8, wherein when the visible light transmittance is obtained by computing only the light absorption by the composite tungsten oxide fine particles is 70%:
   the average value of transmittance in the wavelength region from 800 nm to 900 nm is from 12% to 40%,
   the average value of transmittance in the wavelength region from 1200 nm to 1500 nm is 8% or lower, and
   the transmittance at a wavelength of 2100 nm is 8.0% or lower.

10. A method for producing a heat ray shielding laminated transparent substrate, comprising:

sandwiching the heat ray shielding fine particle dispersion body of claim 1 with a transparent substrate.

11. A method for producing a heat ray shielding laminated transparent substrate, comprising:
molding the heat ray shielding fine particle dispersion body of claim 1 into a film shape or a board shape.

\* \* \* \* \*